US012360257B2

(12) United States Patent
McCaughan et al.

(10) Patent No.: US 12,360,257 B2
(45) Date of Patent: Jul. 15, 2025

(54) THERMALLY COUPLED IMAGER FOR PERFORMING TIME AND POSITION SENSITIVE IMAGING OF SINGLE PHOTONS

(71) Applicant: Government of the United States of America, as represented by the Secretary of Commerce, Gaithersburg, MD (US)

(72) Inventors: Adam Nykoruk McCaughan, Denver, CO (US); Boris Alexander Korzh, Altadena, CA (US); Varun Boehm Verma, Lafayette, CO (US); Sae Woo Nam, Boulder, CO (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 854 days.

(21) Appl. No.: 17/512,279

(22) Filed: Oct. 27, 2021

(65) Prior Publication Data
US 2024/0402007 A1    Dec. 5, 2024

(51) Int. Cl.
| | |
|---|---|
| G01T 1/16 | (2006.01) |
| G01J 1/42 | (2006.01) |
| G01J 1/44 | (2006.01) |
| G01T 1/26 | (2006.01) |
| G01T 1/29 | (2006.01) |

(52) U.S. Cl.
CPC ............ *G01T 1/1606* (2013.01); *G01J 1/429* (2013.01); *G01J 1/44* (2013.01); *G01T 1/26* (2013.01); *G01T 1/2914* (2013.01); *G01J 2001/442* (2013.01); *G01J 2001/448* (2013.01)

(58) Field of Classification Search
None
See application file for complete search history.

(56) References Cited

U.S. PATENT DOCUMENTS

| | | | | |
|---|---|---|---|---|
| 11,289,590 B1 * | 3/2022 | Najafi | ............... | H10N 60/30 |
| 11,522,115 B2 * | 12/2022 | Zhu | ................ | H10N 60/84 |
| 11,569,816 B1 * | 1/2023 | Najafi | ............... | H10N 60/35 |
| 11,971,486 B2 * | 4/2024 | Zhang | ............. | H04N 25/772 |
| 2020/0284650 A1 * | 9/2020 | Najafi | ................. | G01J 1/44 |

(Continued)

OTHER PUBLICATIONS

Zhao, Q.-Y. et al., "Single-photon imager based on a superconducting nanowire delay line", Nature Photonics, 2017, p. 247-252, vol. 11.

(Continued)

*Primary Examiner* — Thomas R Artman
(74) *Attorney, Agent, or Firm* — Office of Chief Counsel for National Institute of Standards and Technology

(57) ABSTRACT

A thermally coupled imager includes a single photon detection pixel electrically isolated but in thermal communication with a thermal readout bus via a thermally conductive galvanic isolator, wherein the single photon detection pixel receives a single photon and produces thermal energy that is communicated to the thermal readout bus. A position and time of arrival of the single photon received by the single photon detection pixel is determined from voltage pulses produced by the thermal readout bus in response to receiving the thermal energy from the single photon detection pixel.

17 Claims, 19 Drawing Sheets

(56) References Cited

U.S. PATENT DOCUMENTS

| | | | |
|---|---|---|---|
| 2021/0119102 A1* | 4/2021 | Zhu | G01J 1/44 |
| 2021/0398345 A1* | 12/2021 | Zhang | G01J 1/44 |
| 2022/0236108 A1* | 7/2022 | Perrenoud | G01J 5/20 |
| 2023/0079154 A1* | 3/2023 | Zhang | G01S 17/894 250/214 R |
| 2024/0402007 A1* | 12/2024 | McCaughan | G01T 1/1606 |

OTHER PUBLICATIONS

Lee, S.-B., et al., "Superconducting nanotransistor based digital logic gates", Nanotechnology, 2003, p. 188-191, vol. 14.

Allman, M. S., et al., "A near-infrared 64-pixel superconducting nanowire single photon detector array with integrated multiplexed readout", Appl. Phys. Lett., 2015, p. 192601, vol. 106.

Dauler, E. a. et al., "Multi-Element Superconducting Nanowire Single-Photon Detector", IEEE Trans. Applied Superconductivity, 2007, p. 279-284, vol. 17.

Doerner, S., et al., "Operation of Superconducting Nanowire Single-Photon Detectors Embedded in Lumped-Element Resonant Circuits", IEEE Trans. Appl. Supercond., 2016, p. 1-5, vol. 26.

McCaughan, A.N., "Readout architectures for superconducting nanowire single photon detectors",, Superconductor Science and Technology, 2018, p. 040501, vol. 31, DOI: https://doi.org/10.1088/1361-6668/aaa1b3.

McCaughan, A.N., et al., "A superconducting thermal switch with ultrahigh impedance for interfacing superconductors to semiconductors", Nature Electronics, 2019, p. 451-456, vol. 2.

Allmaras, J.P., et al., "Demonstration of a Thermally Coupled Row-col. SNSPD Imaging Array", Nano Letters, 2020, p. 2163-2168, vol. 20.

Steinhauer, S., et al., "Progress on large-scale superconducting nanowire single-photon detectors", Applied Physics Letters, 2021, p. 100501, vol. 118.

Wollman, E., et al., "Superconducting Nanowire Single-Photon Detectors", OST Detector Roadmap workshop, Jet Propulsion Laboratory, 2018, p. 1-22, doi: https://trs.jpl.nasa.gov/bitstream/handle/2014/49547/CL%2318-2091.pdf?sequence=1&isAllowed=y.

Verma, V.B., et al., "Athermal avalanche in bilayer superconducting nanowire single-photon detectors", Applied Physics Letters, 2016, p. 131108, vol. 108.

\* cited by examiner

300

301 — liftoff gold pads

302 — dep + etch WSi

303 — dep SiO$_2$

304 — cut vias

305 — liftoff gold pads

306 — liftoff resistor

307 — dep + etch WSi

THERMALLY COUPLED IMAGER FOR PERFORMING TIME AND POSITION SENSITIVE IMAGING OF SINGLE PHOTONS

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a thermally coupled imager for performing time and position sensitive imaging of single photons, the thermally coupled imager comprising: a single photon detection pixel comprising: a superconducting nanowire single photon detector that receives an electrical current bias and that, in response to receiving a single photon, transitions from a superconducting state via heating; and a resistive heater in electrical communication with the superconducting nanowire single photon detector and electrically connected in parallel with the superconducting nanowire single photon detector, such that when the single photon is received by the superconducting nanowire single photon detector: the electrical current bias is diverted from being received by the superconducting nanowire single photon detector and is electrically communicated to the resistive heater; the resistive heater converts the electrical current bias into thermal energy, and the thermal energy is thermally communicated to a thermally conductive galvanic isolator; the thermally conductive galvanic isolator in thermal communication with the resistive heater and a thermal readout bus, such that the thermally conductive galvanic isolator receives the thermal energy from the resistive heater, electrically isolates the single photon detection pixel from the thermal readout bus, and thermally communicates the thermal energy from the resistive heater to the thermal readout bus in an absence of electrical crosstalk between the single photon detection pixel and the thermal readout bus; and the thermal readout bus in thermal communication with the thermally conductive galvanic isolator and in electrical isolation with the single photon detection pixel and comprising: a superconducting nanowire; a thermal detection portion disposed proximate to the resistive heater in thermal communication with the thermally conductive galvanic isolator; and a total length L between a first terminus and a second terminus, such that: the thermal readout bus receives an electrical current readout bias, the thermal detection portion is interposed between the first terminus and the second terminus and arranged at a first distance L1 from the first terminus and a second distance L2 from the second terminus; the thermal detection portion receives the thermal energy from the resistive heater via the thermally conductive galvanic isolator, in response to receiving the thermal energy, the thermal detection portion transitions from a superconducting state and produces a pair of voltage pulses from the electrical current readout bias that propagate in the thermal readout bus away from the thermal detection portion, such that one voltage pulse propagates from the thermal detection portion toward the first terminus during a first time-of-flight period, and the other voltage pulse propagates from the thermal detection portion toward the second terminus during a second time-of-flight period, wherein the pair of voltage pulses, the first time-of-flight period, and the second time-of-flight period provide a time of arrival and position of the single photon received by the single photon detection pixel.

Disclosed is a thermally coupled imager for performing time and position sensitive imaging of single photons, the thermally coupled imager comprising: a thermally conductive galvanic isolator; a thermal readout bus in thermal communication with the thermally conductive galvanic isolator; a plurality of single photon detection pixels, wherein the single photon detection pixels are: electrically isolated from each other and from the thermal readout bus, in thermal communication with thermal readout bus via the thermally conductive galvanic isolator that is interposed between the single photon detection pixels and the thermal readout bus, and arranged along the thermal readout bus, such that each single photon detection pixel: is individually in thermal communication with the thermal readout bus in a different location along the thermal readout bus at separate thermal detection portions of the thermal readout bus, but electrically isolated from the thermal readout bus via interdisposition of the thermally conductive galvanic isolator between individual single photon detection pixel and the thermal readout bus, individually produces thermal energy in response to receiving a single photon, and communicates the thermal energy to the thermal readout bus via the thermally conductive galvanic isolator, wherein the thermal readout bus, in response to receiving the thermal energy from the individual single photon detection pixel at a respective thermal detection portion, transitions from a superconducting state and produces: a pair of voltage pulses corresponding to a position of the individual single photon detection pixel along the thermal readout bus so that the pair of voltage pulses propagate in the thermal readout bus, wherein one voltage pulse of the pair propagates toward a first terminus during a first time-of-flight period, and the other voltage pulse of the pair propagates toward a second terminus during a second time-of-flight period, such that the pair of voltage pulses, the first time-of-flight period, and the second time-of-flight period provide a time of arrival and position of the individual single photon detection pixel that received the single photon.

Disclosed is a process for performing time and position sensitive imaging of single photons, the process comprising: receiving a single-photon by a single-photon detection pixel; producing thermal energy by the single-photon detection pixel in response to receiving the single-photon; communicating the thermal energy from the single-photon detection pixel to a thermally conductive galvanic isolator; receiving the thermal energy by the conductive galvanic isolator and communicating the thermal energy from the thermally conductive galvanic isolator to a thermal readout bus; receiving the thermal energy by the thermal readout bus and in response to receiving the thermal energy transitioning from a superconducting state and producing a pair of voltage pulses that propagates in the thermal readout bus, such that one voltage pulse propagates toward a first terminus of the thermal readout bus during a first time-of-flight period, and the other voltage pulse propagates toward the second terminus of the thermal readout bus during a second time-of-flight period; and determining a time of arrival and position of the single photon received by the single photon detection pixel from the pair of voltage pulses, the first time-of-flight period, and the second time-of-flight period to perform time and position sensitive imaging of the single photon.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
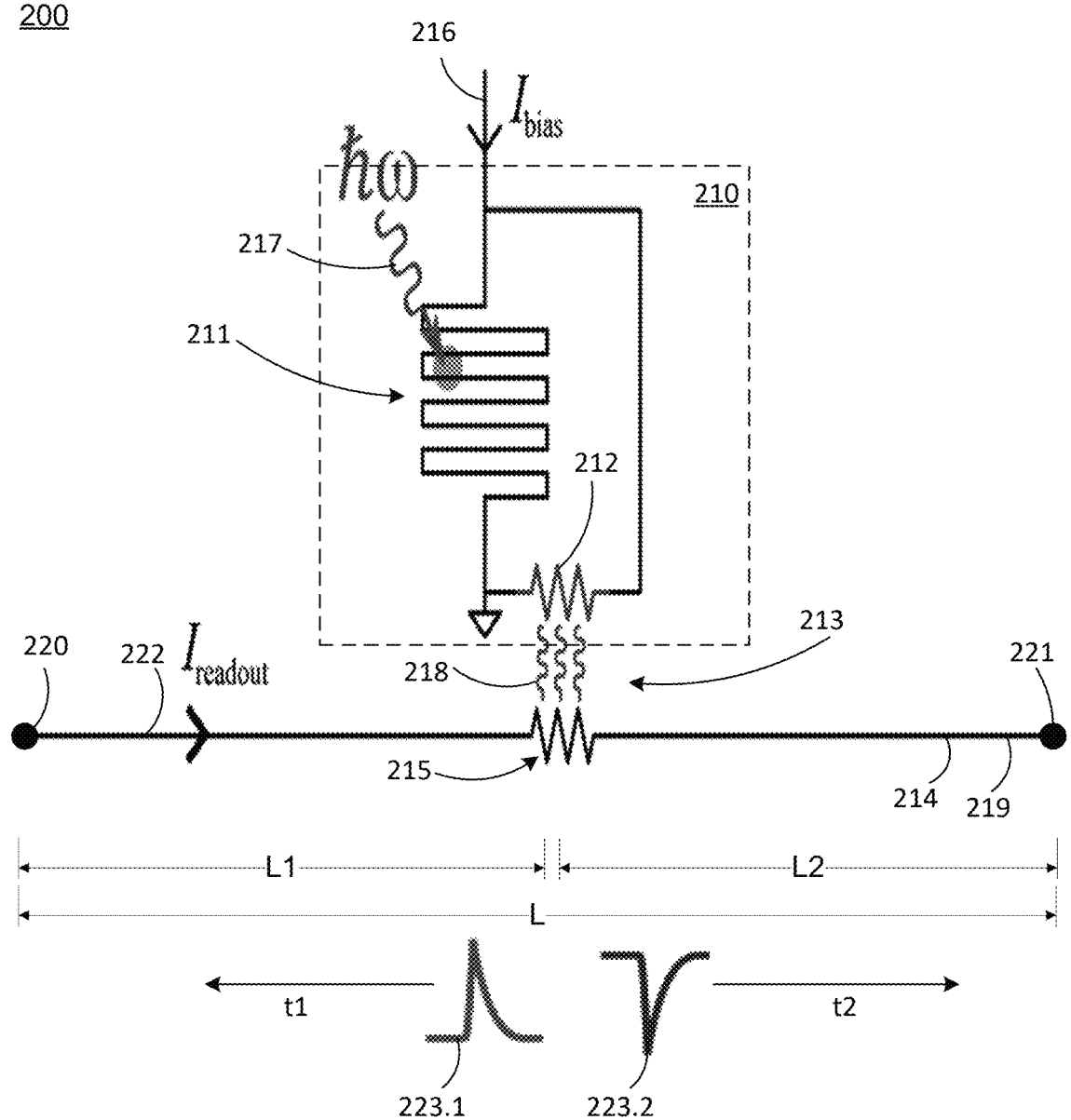
FIG. 1 shows a thermally coupled imager, according to some embodiments.

A detailed description of one or more embodiments is presented herein by way of exemplification and not limitation.

Superconducting nanowire single photon detectors (SNSPDs) provide single photon detection with count rates greater than 100 MHz, timing jitter less than 5 ps, and dark count rate less than 1 Hz. An efficient multiplexed readout of an array N (an integer number) pixels of SNSPDs with many fewer than N wires is difficult to achieve. A need exists for large numbers of SNSPDs to be read out at a high count rates. In classical communications, SNSPDs are used in low-power deeps space communication. In astronomy, the search for exoplanets has produced a desire for low-dark-count, high count-rate cameras with high pixel counts. Further, in quantum communications, SNSPDs are used in high-fidelity readout of quantum photonic states, and are useful to multiplex hundreds or thousands of detectors together. SNSPDs can operate efficiently in a broad range of wavelengths in the X-ray to mid-IR range with potential for far-IR and terahertz range operation.

However, financial cost and thermal limitations of reading conventional multiple SNSPDs with individual coax lines has limited the number of SNSPDs being read out in a conventional parallel fashion, with a large array containing 64 pixels. Conventual silicon electronics dissipates too much power to use in close proximity to the cryogenically cooled SNSPDs, and despite over a decade of attempts at integrating superconducting electronics like RSFQ as a readout methodology, no more than a few SNPSDs have been read out successfully with RSFQ due to barriers of fabrication compatibility and tight operating margins for RSFQ. Conventional multiplexing SNSPDs in the analog domain (e.g., connecting them together in a row-column readout arrangement) creates crosstalk between devices that can limit how many detectors can be readout efficiently.

It has been discovered that a thermally coupled imager that includes single photon detection pixels described herein provides read out, e.g., for tens of thousands of such single photon detection pixels. The thermally coupled imager efficiently multiplexes SNSPDs in thermal communication but electrically isolated from a thermal readout bus and that resolves both location and time-of-arrival of single photons over a large (>1×1 mm) time and position sensitive area.

Thermally coupled imager 200 performs time and position sensitive imaging of single photons. In an embodiment, with reference to FIG. 1, FIG. 2, FIG. 3, FIG. 4, FIG. 5, FIG. 6, FIG. 7, FIG. 8, FIG. 9, and FIG. 10, thermally coupled imager 200 includes: a single photon detection pixel 210 including: a superconducting nanowire single photon detector 211 that receives an electrical current bias 216 and that, in response to receiving a single photon 217, transitions from a superconducting state via heating; and a resistive heater 212 in electrical communication with the superconducting nanowire single photon detector 211 and electrically connected in parallel with the superconducting nanowire single photon detector 211, such that when the single photon 217 is received by the superconducting nanowire single photon detector 211: the electrical current bias 216 is diverted from being received by the superconducting nanowire single photon detector 211 and is electrically communicated to the resistive heater 212; the resistive heater 212 converts the electrical current bias 216 into thermal energy 218, and the thermal energy 218 is thermally communicated to a thermally conductive galvanic isolator 213; the thermally conductive galvanic isolator 213 in thermal communication with the resistive heater 212 and a thermal readout bus 214, such that the thermally conductive galvanic isolator 213 receives the thermal energy 218 from the resistive heater 212, electrically isolates the single photon detection pixel 210 from the thermal readout bus 214, and thermally communicates the thermal energy 218 from the resistive heater 212 to the thermal readout bus 214 in an absence of electrical crosstalk between the single photon detection pixel 210 and the thermal readout bus 214; and the thermal readout bus 214 in thermal communication with the thermally conductive galvanic isolator 213 and in electrical isolation with the single photon detection pixel 210 and comprising: a superconducting nanowire 219; a thermal detection portion 215 disposed proximate to the resistive heater 212 in thermal communication with the thermally conductive galvanic isolator 213; and a total length L between a first terminus 220 and a second terminus 221, such that: the thermal readout bus 214 receives an electrical current readout bias 222, the thermal detection portion 215 is interposed between the first terminus 220 and the second terminus 221 and arranged at a first distance L1 from the first terminus 220 and a second distance L2 from the second terminus 221; the thermal detection portion 215 receives the thermal energy 218 from the resistive heater 212 via the thermally conductive galvanic isolator 213, in response to receiving the thermal energy 218, the thermal detection portion 215 transitions from a superconducting state and produces a pair of voltage pulses from the electrical current readout bias 222 that propagate in the thermal readout bus 214 away from the thermal detection portion 215, such that one voltage pulse 223.1 propagates from the thermal detection portion 215 toward the first terminus 220 during a first time-of-flight period, and the other voltage pulse 223.2 propagates from the thermal detection portion 215 toward the second terminus 221 during a second time-of-flight period, wherein the pair of voltage pulses, the first time-of-flight period, and the second time-of-flight period provide a time of arrival and position of the single photon 217 received by the single photon detection pixel 210.

In an embodiment, thermally coupled imager 200 further includes: a second single photon detection pixel 210 arranged along the thermal readout bus 214 and electrically isolated from the single photon detection pixel 210 of claim 1; and the thermal readout bus 214 comprises a second thermal detection portion 215 disposed proximate to the second single photon detection pixel 210 and in thermal communication with the second single photon detection pixel 210 via the thermally conductive galvanic isolator 213 that electrically isolates the thermal readout bus 214 and the single photon detection pixel 210, wherein: the second single photon detection pixel 210 receives a second single photon 217 and produces thermal energy 218 in response to receipt of the second single photon 217, and the second thermal detection portion 215 of the thermal readout bus 214 receives the thermal energy 218 from the second single photon detection pixel 210, transitions from the superconducting state, and produces a second pair of voltage pulses that corresponds to a position of the second single photon detection pixel 210 along the thermal readout bus 214, such that of the second pair of voltage pulses: one voltage pulse 223 propagates from the second thermal detection portion 215 toward the first terminus 220 during a third time-of-flight period, and the other voltage pulse 223 propagates from the second thermal detection portion 215 toward the second terminus 221 during a fourth time-of-flight period, and the second pair of voltage pulses, the third time-of-flight period, and the fourth time-of-flight period provide a time of arrival and position of the second single photon detection pixel 210 that received the second single photon 217. In an embodiment, the second single photon detection pixel 210 includes: a superconducting nanowire single photon detector 211 that receives an electrical current bias 216 and that, in response to receiving the second single photon 217, transitions from a superconducting state via heating; and a resistive heater 212 in electrical communication with the superconducting nanowire single photon detector 211 and electrically connected in parallel with the superconducting nanowire single photon detector 211, such that when the second single photon 217 is received by the superconducting nanowire single photon detector 211: the electrical current bias 216 is diverted from being received by the superconducting nanowire single photon detector 211 and is electrically communicated to the resistive heater 212; the resistive heater 212 converts the electrical current bias 216 into thermal energy 218, and the thermal energy 218 is thermally communicated to the thermally conductive galvanic isolator 213, wherein the thermally conductive galvanic isolator 213 receives the thermal energy 218 from the resistive heater 212 of the second single photon detection pixel 210, electrically isolates the second single photon detection pixel 210 from the thermal readout bus 214, and thermally communicates the thermal energy 218 from the resistive heater 212 of the second single photon detection pixel 210 to the thermal readout bus 214 in an absence of electrical crosstalk between the single photon detection pixel 210, the second single photon detection pixel 210, and the thermal readout bus 214.

In an embodiment, thermally coupled imager 200 includes additional single photon detection pixels 210, such that each additional single photon detection pixel 210: is disposed proximate to and in thermal communication with individual thermal detection portions 215 of the thermal readout bus 214, is electrically isolated from the other single photon detection pixels 210 and the thermal readout bus 214, and produces, in response to receiving a single photon, thermal energy that is communicated to the thermal readout bus 214 at its respective thermal detection portion 215 that produces pairs of voltage pulses in response to receiving the thermal energy that propagate separately toward the first terminus 220 and the second terminus 221 for determination of a time of arrival and position of the particular single photon detection pixel 210 that received the respective single photon 217. In an embodiment, the single photon detection pixel 210, the second single photon detection pixel 210, and the additional single photon detection pixel 210 are arranged in a linear array format and perform one-dimensional imaging of single photons received by the thermally coupled imager 200. According to an embodiment, the single photon detection pixel 210, the second single photon detection pixel 210, and the additional single photon detection pixel 210 are arranged in a non-linear array format and perform multidimensional imaging of single photons received by the thermally coupled imager 200.

In an embodiment, thermally coupled imager 200 further includes a second imaging layer 224.2, wherein the single photon detection pixel 210, the thermally conductive galvanic isolator 213, and the thermal readout bus 214 of claim 1 are arranged in a first imaging layer 224.1 that is electrically isolated from the second imaging layer 224.2, and the second imaging layer 224.2 includes: a single photon detection pixel 210 in thermal communication with a thermal readout bus 214; a thermally conductive galvanic isolator 213 interposed between and that electrically isolates the single photon detection pixel 210 from the thermal readout bus 214, such that: the single photon detection pixel 210 in the first imaging layer 224.1 communicates some of the thermal energy 218 to the single photon detection pixel 210 in the second imaging layer 224.2 in response to receiving the single photon 217, the single photon detection pixel 210 in the second imaging layer 224.2 receives the thermal energy 218 from the single photon detection pixel 210 in the first imaging layer 224.1 and produces thermal energy 218 that is communicated from the single photon detection pixel 210 in the second imaging layer 224.2 to the thermal readout bus 214 in the second imaging layer 224.2, and the thermal readout bus 214 in the second imaging layer 224.2 produces a pair of voltage pulses from which the two-dimensional position of the single photon received by the thermally coupled imager 200 at the superconducting nanowire single photon detector 211 in the first imaging layer 224.1 is determined. In an embodiment, the second imaging layer 224.2 further includes: additional single photon detection pixels 210, such that each additional single photon detection pixel 210 in the second imaging layer 224.2: is disposed proximate to and in thermal communication with individual thermal detection portions 215 of the thermal readout bus 214 in the second imaging layer 224.2, is electrically isolated from the other single photon detection pixels 210 and the thermal readout bus 214 in the second imaging layer 224.2 and in the first imaging layer 224.1, and produces, in response to receiving thermal energy from the first imaging layer 224.1, thermal energy that is communicated to the thermal readout bus 214 in the second imaging layer 224.2 at its respective thermal detection portion 215 that produces pairs of voltage pulses in response to receiving the thermal energy that propagate separately toward a first terminus 220 and a second terminus 221 of the thermal readout bus 214 in the second imaging layer 224.2 for determination of the position of the particular single photon detection pixel 210 that received the respective single photon 217 in the first imaging layer 224.1.

In some embodiments, in the second imaging layer 224.2, the single photon detection pixel 210, the second single photon detection pixel 210, and the additional single photon detection pixel 210 are arranged in a linear array format.

In some embodiments, in the second imaging layer 224.2, the single photon detection pixel 210, the second single photon detection pixel 210, and the additional single photon detection pixel 210 are arranged in a non-linear array format and perform multidimensional imaging of single photons received by the thermally coupled imager 200 in the first imaging layer 224.1.

In an embodiment, the superconducting nanowire single photon detector 211 comprises a meander pattern as shown in FIG. 4A. In an embodiment, the superconducting nanowire single photon detector 211 consists essentially of a linear pattern as shown in FIG. 4B. Without limitation, other formats besides the meander and linear format can be used for the superconducting nanowire single photon detector 211. The serpentine pattern shown in FIG. 4A can be schematically represented by a rectangle as shown in FIG. 4C, and the linear pattern shown in FIG. 4B can be schematically represented by a line or other curve as shown in FIG. 4D. It should be appreciated that, depending on operability, device architecture, or preference of thermally coupled imager 200, the meander and linear patterns can be interchanged for superconducting nanowire single photon detector 211.

In an embodiment, thermally coupled imager 200 performs time and position sensitive imaging of single photons 217 and includes: a thermally conductive galvanic isolator 213; a thermal readout bus 214 in thermal communication with the thermally conductive galvanic isolator 213; a plurality of single photon detection pixels 210, wherein the single photon detection pixels 210 are: electrically isolated from each other and from the thermal readout bus 214, in thermal communication with thermal readout bus 214 via the thermally conductive galvanic isolator 213 that is interposed between the single photon detection pixels 210 and the thermal readout bus 214, and arranged along the thermal readout bus 214, such that each single photon detection pixel 210: is individually in thermal communication with the thermal readout bus 214 in a different location along the thermal readout bus 214 at separate thermal detection portions 215 of the thermal readout bus 214, but electrically isolated from the thermal readout bus 214 via interdisposition of the thermally conductive galvanic isolator 213 between individual single photon detection pixel 210 and the thermal readout bus 214, individually produces thermal energy 218 in response to receiving a single photon 217, and communicates the thermal energy 218 to the thermal readout bus 214 via the thermally conductive galvanic isolator 213, wherein the thermal readout bus 214, in response to receiving the thermal energy 218 from the individual single photon detection pixel 210 at a respective thermal detection portion 215, transitions from a superconducting state and produces: a pair of voltage pulses corresponding to a position of the individual single photon detection pixel 210 along the thermal readout bus 214 so that the pair of voltage pulses propagate in the thermal readout bus 214, wherein one voltage pulse 223.1 of the pair propagates toward a first terminus 220 during a first time-of-flight period, and the other voltage pulse 223.2 of the pair propagates toward a second terminus 221 during a second time-of-flight period, such that the pair of voltage pulses, the first time-of-flight period, and the second time-of-flight period provide a time of arrival and position of the individual single photon detection pixel 210 that received the single photon 217. In an embodiment, the single photon detection pixels 210 are arranged in a linear array format and perform one-dimensional imaging of single photons received by the thermally coupled imager 200. In an embodiment, single photon detection pixels 210 are arranged in a non-linear array format and perform multidimensional imaging of single photons received by the thermally coupled imager 200. In an embodiment, superconducting nanowire single photon detector 211 comprises a meander pattern. According to some embodiments, the superconducting nanowire single photon detector 211 consists essentially of a linear pattern.

In an embodiment, thermally coupled imager 200 further includes second imaging layer 224.2, wherein the thermally conductive galvanic isolator 213, the thermal readout bus 214, and the single photon detection pixels 210 of claim 13 are arranged in a first imaging layer 224.1 that is electrically isolated from the second imaging layer 224.2, and the second imaging layer 224.2 includes: a plurality of single photon detection pixels 210 in thermal communication with a thermal readout bus 214; a thermally conductive galvanic isolator 213 interposed between and that electrically isolates the single photon detection pixels 210 from the single photon detection pixel 210, such that: individual single photon detection pixels 210 in the first imaging layer 224.1 communicate thermal energy 218 to an individual single photon detection pixel 210 in the second imaging layer 224.2 in response to receiving single photons 217, individual single photon detection pixels 210 in the second imaging layer 224.2 receives thermal energy 218 from individual single photon detection pixels 210 in the first imaging layer 224.1 and produces thermal energy 218 that is communicated from the single photon detection pixel 210 in the second imaging layer 224.2 to the thermal readout bus 214 in the second imaging layer 224.2, and the thermal readout bus 214 in the second imaging layer 224.2 in response to receiving thermal energy 218 produces a pair of voltage pulses from which the two-dimensional position of the single photon received by the thermally coupled imager 200 at the superconducting nanowire single photon detector 211 in the first imaging layer 224.1 is determined. In an embodiment, each single photon detection pixel 210 in the second imaging layer 224.2: is disposed proximate to and in thermal communication with individual thermal detection portions 215 of the thermal readout bus 214 in the second imaging layer 224.2, is electrically isolated from the other single photon detection pixels 210 and the thermal readout bus 214 in the second imaging layer 224.2 and in the first imaging layer 224.1, and produces, in response to receiving thermal energy from the first imaging layer 224.1, thermal energy that is communicated to the thermal readout bus 214 in the second imaging layer 224.2 at its respective thermal detection portion 215 that produces pairs of voltage pulses in response to receiving the thermal energy that propagate separately toward a first terminus 220 and a second terminus 221 of the thermal readout bus 214 in the second imaging layer 224.2 for determination of the position of the particular single photon detection pixel 210 that received the respective single photon 217 in the first imaging layer 224.1. In an embodiment, in the second imaging layer 224.2, the single photon detection pixels 210 are arranged in a linear array format.

In an embodiment, in the second imaging layer 224.2, the single photon detection pixels 210 are arranged in a non-linear array format and perform multidimensional imaging of single photons received by the thermally coupled imager 200 in the first imaging layer 224.1.

In an embodiment, in the second imaging layer 224.2, the position of single photon detection pixels 210 are the same as the position of single photon detection pixels 210 in the first imaging layer 224.1 so that thermal energy 218 produced by a single photon detection pixel 210 in the imaging layer 224.1 is received by a single photon detection pixel 210 in the second imaging layer 224.2.

In an embodiment, in the second imaging layer 224.2, the single photon detection pixels 210 are arranged in rows and columns that match the position of single photon detection pixels 210 in the first imaging layer 224.1 that are arranged in rows and columns, so that thermal energy 218 produced by a single photon detection pixel 210 in the imaging layer 224.1 is received by a single photon detection pixel 210 in the second imaging layer 224.2.

Resistive heater 212 can include a non-superconducting material such as titanium (Ti), chromium (Cr), gold (Au), gold-palladium (AuPd), tantalum (Ta), and the like.

Resistive heater 212 can include a superconducting material such as niobium nitride (NbN), tungsten silicide (WSi), $YBa_2Cu_3O_7$, and the like. When electrical current bias 216 is diverted from being received by superconducting nanowire single photon detector 211 and is electrically communicated to the resistive heater 212, the electrical current bias 216 may exceed the superconducting critical current of the resistive heater 212 and produce thermal energy 218.

In thermally coupled imager 200, an array of single photon detection pixels 210 includes superconducting nanowire single photon detector 211 that can be a superconducting nanowire with a meander pattern having a rectangular cross section (e.g., about 5 nm by about 100 nm) or a linear superconducting nanowire. The length can be hundreds of micrometers, and the superconducting nanowire can be patterned in compact meander geometry so as to create a square or circular pixel with high detection efficiency. The superconducting nanowire can be made of, for example, niobium nitride (NbN), tungsten silicide (WSi), $YBa_2Cu_3O_7$, or any other material known in the art.

In operation, the superconducting nanowire of the single photon detection pixel 210 and the thermal readout bus 214 can be maintained below their superconducting critical temperature Tc and direct current biased just below its critical current. Without being bound by any particular theory of mode of operation, incident photons having sufficient energy to disrupt hundreds of Cooper pairs in a superconductor can therefore form a hotspot in superconducting nanowire single photon detector 211. The hotspot itself typically is not large enough to span the entire width of the nanowire. Therefore, the hotspot region can force the supercurrent to flow around the resistive region. The local current density in the can increase beyond the critical current density and form a resistive barrier across the width of the superconducting nanowire of superconducting nanowire single photon detector 211. The sudden increase in resistance from zero to a finite value diverts electrical current bias 216 from superconducting nanowire single photon detector 211 to resistive heater 212. Resistive heater 212 produces thermal energy 218 that is thermally communicated to thermal readout bus 214 and received by thermal readout bus 214 as phonons. Moreover, in thermal readout bus 214, the sudden increase in resistance caused by localized heating at thermal detection portion 215 from zero to a finite value generates a measurable output as voltage pulses 223 across thermal readout bus 214.

Elements of thermally coupled imager 200 can be made of a material that is physically or chemically resilient in an environment in which thermally coupled imager 200 is disposed. Exemplary materials include a metal, ceramic, thermoplastic, glass, semiconductor, and the like. The elements of thermally coupled imager 200 can be made of the same or different material and can be monolithic in a single physical body or can be separate members that are physically joined.

Thermally coupled imager 200 can be made in various ways. It should be appreciated that thermally coupled imager 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, thermally coupled imager 200 can be disposed in a terrestrial environment or space environment. Elements of thermally coupled imager 200 can be formed from silicon, silicon nitride, and the like although other suitable materials, such ceramic, glass, or metal can be used. According to an embodiment, the elements of thermally coupled imager 200 are formed using optical lithography or 3D printing although the elements of thermally coupled imager 200 can be formed using other methods, such as injection molding or machining a stock material such as block of material that is subjected to removal of material such as by etching, cutting, laser oblation, and the like. Accordingly, thermally coupled imager 200 can be made by additive or subtractive manufacturing. In an embodiment, elements of thermally coupled imager 200 are selectively etched to remove various different materials using different etchants and photolithographic masks and procedures. The various layers thus formed can be subjected to joining by bonding to form thermally coupled imager 200.

Figure 13:
FIG. 13 shows a process for making a thermally coupled imager, according to some embodiments.
Figure 13:
Figure 13:
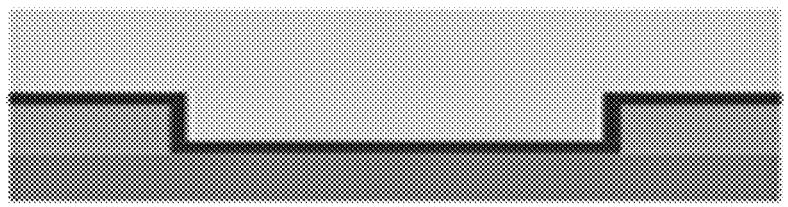
Figure 13:
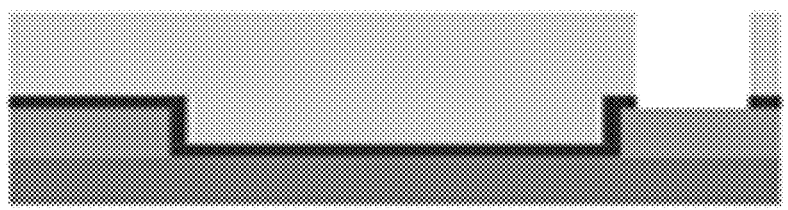
Figure 13:
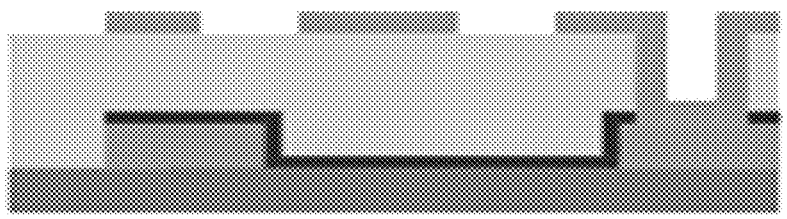
Figure 13:
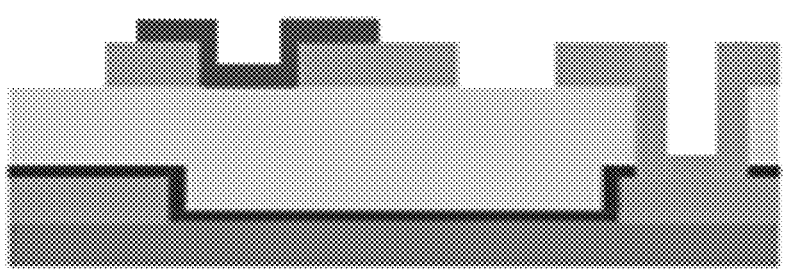
Figure 13:
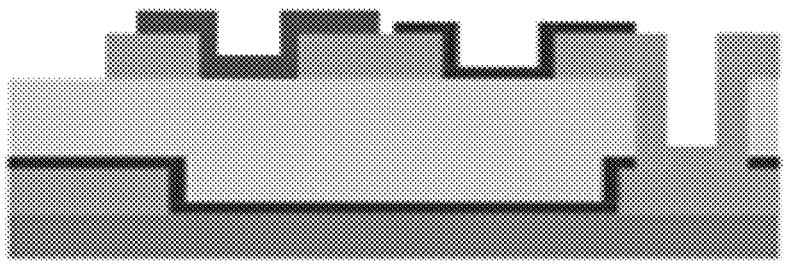

In an embodiment, with reference to FIG. 13, a process 300 for making thermally coupled imager 200 includes forming a pattern of gold pads on a substrate (step 301); depositing and etching WSi on the gold pattern and exposed portion of the substrate (step 302); forming $SiO_2$ on the WSi (step 303); forming vias through the $SiO_2$ and WSi to expose a portion of the gold pad (step 304); forming liftoff gold pads (step 305); forming resistor on the last-form gold pad (step 306); and depositing and etching WSi proximate to the resistor (step 307) to make thermally coupled imager 200.

Thermally coupled imager 200 has numerous advantageous and unexpected benefits and uses. In an embodiment, a process for performing time and position sensitive imaging of single photons 217 with thermally coupled imager 200 includes: receiving a single-photon 217 by a single-photon detection pixel 210; producing thermal energy 218 by the single-photon detection pixel 210 in response to receiving the single-photon 217; communicating the thermal energy 218 from the single-photon detection pixel 210 to a thermally conductive galvanic isolator 213; receiving the thermal energy 218 by the conductive galvanic isolator 213 and communicating the thermal energy 218 from the thermally conductive galvanic isolator 213 to a thermal readout bus 214; receiving the thermal energy 218 by the thermal readout bus 214 and in response to receiving the thermal energy 218 transitioning from a superconducting state and producing a pair of voltage pulses that propagates in the thermal readout bus 214, such that one voltage pulse 223.1 propagates toward a first terminus 220 of the thermal readout bus 214 during a first time-of-flight period, and the other voltage pulse 223.2 propagates toward the second terminus 221 of the thermal readout bus 214 during a second time-of-flight period; and determining a time of arrival and position of the single photon 217 received by the single photon detection pixel 210 from the pair of voltage pulses, the first time-of-flight period, and the second time-of-flight period to perform time and position sensitive imaging of the single photon 217.

Figure 3:
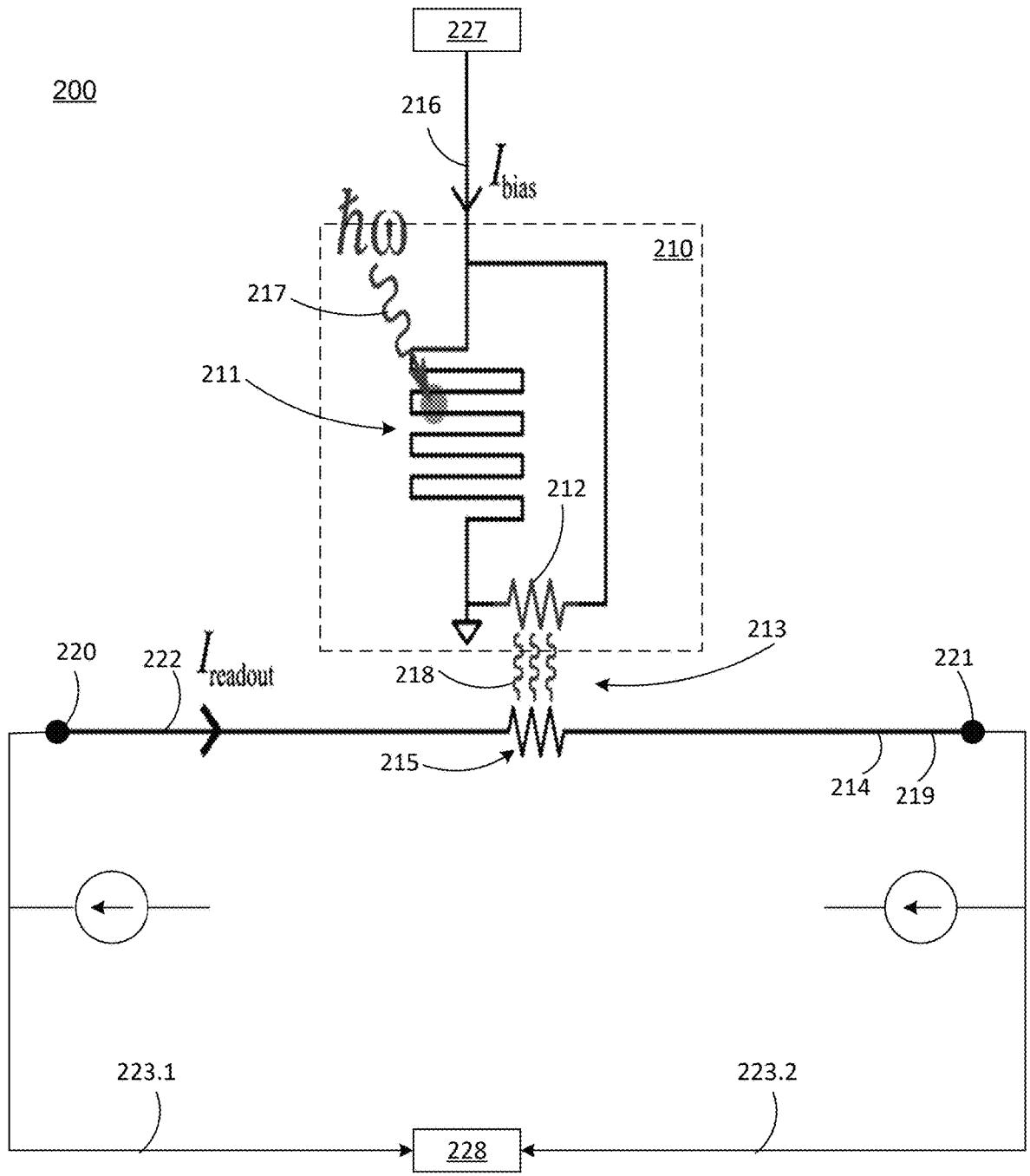
FIG. 3 shows a thermally coupled imager, according to some embodiments.
Figure 4:
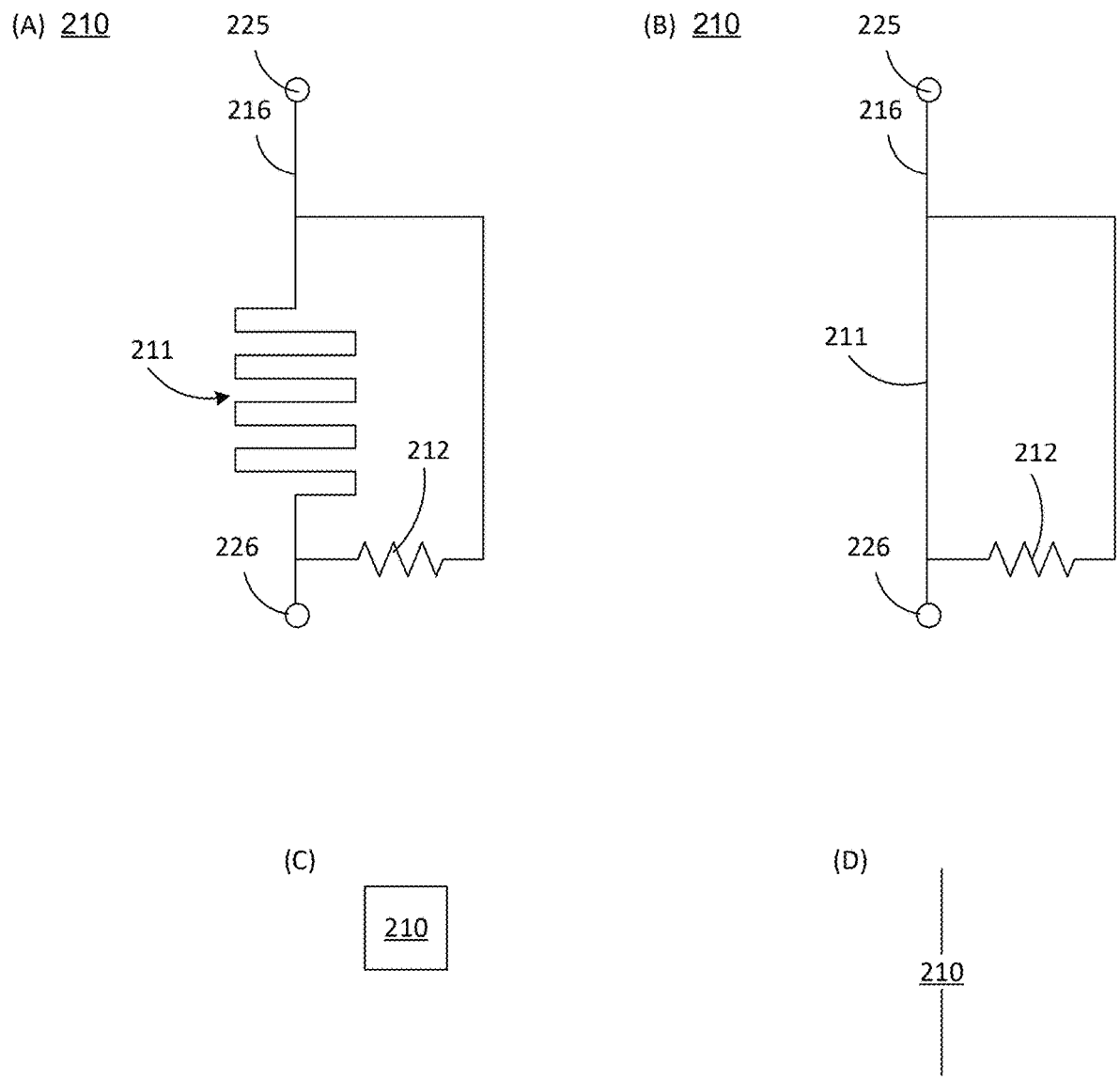
FIG. 4 shows various representations of a single photon detection pixel in panels A, B, C, and D, according to some embodiments.

FIG. 3 provides an exemplary configuration for operating thermally coupled imager 200, wherein power source 227 provides electrical current bias 216. Analyzer 228 receives voltage pulses 223.1 and 223.2 and analyzes their time of arrival to determine the position of the single photon received by thermally coupled imager 200, based on the particular single photon detection 210 that received the single photon.

In an embodiment, thermally coupled imager 200 is patterned into a two-dimensional (2D) imager for imaging single photons 217 incident on a plane or layer containing a plurality of single photon detection pixels 210 or Containing a plurality of imaging layers 224 then include single photon detection pixels 210 arranged in separate imaging layers 224. It is contemplated that beyond imaging single photons 217 incident on plane, various curved shaped substrates can have single photon detection pixel standard 10 and thermal readout bus 214 disposed on such a substrate conformally to provide a non-planar topology for receiving single photon pixels 217. In some embodiments, thermally coupled imager 200 includes a one-dimensional array have single photon detection pixels 210.

Figure 5:
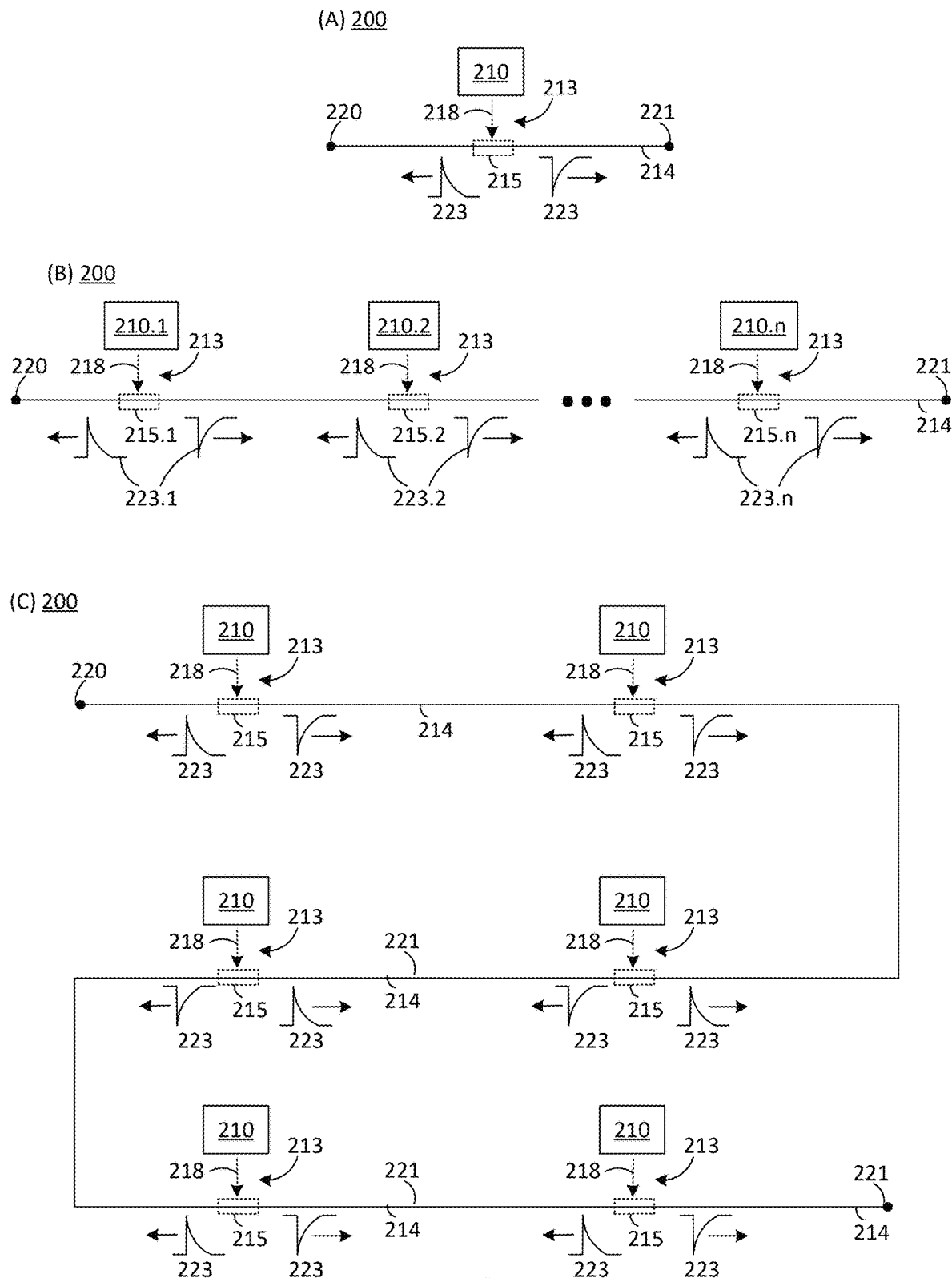
FIG. 5 shows various representations of a thermally coupled imager in panels A, B, and C according to some embodiments.
Figure 6:
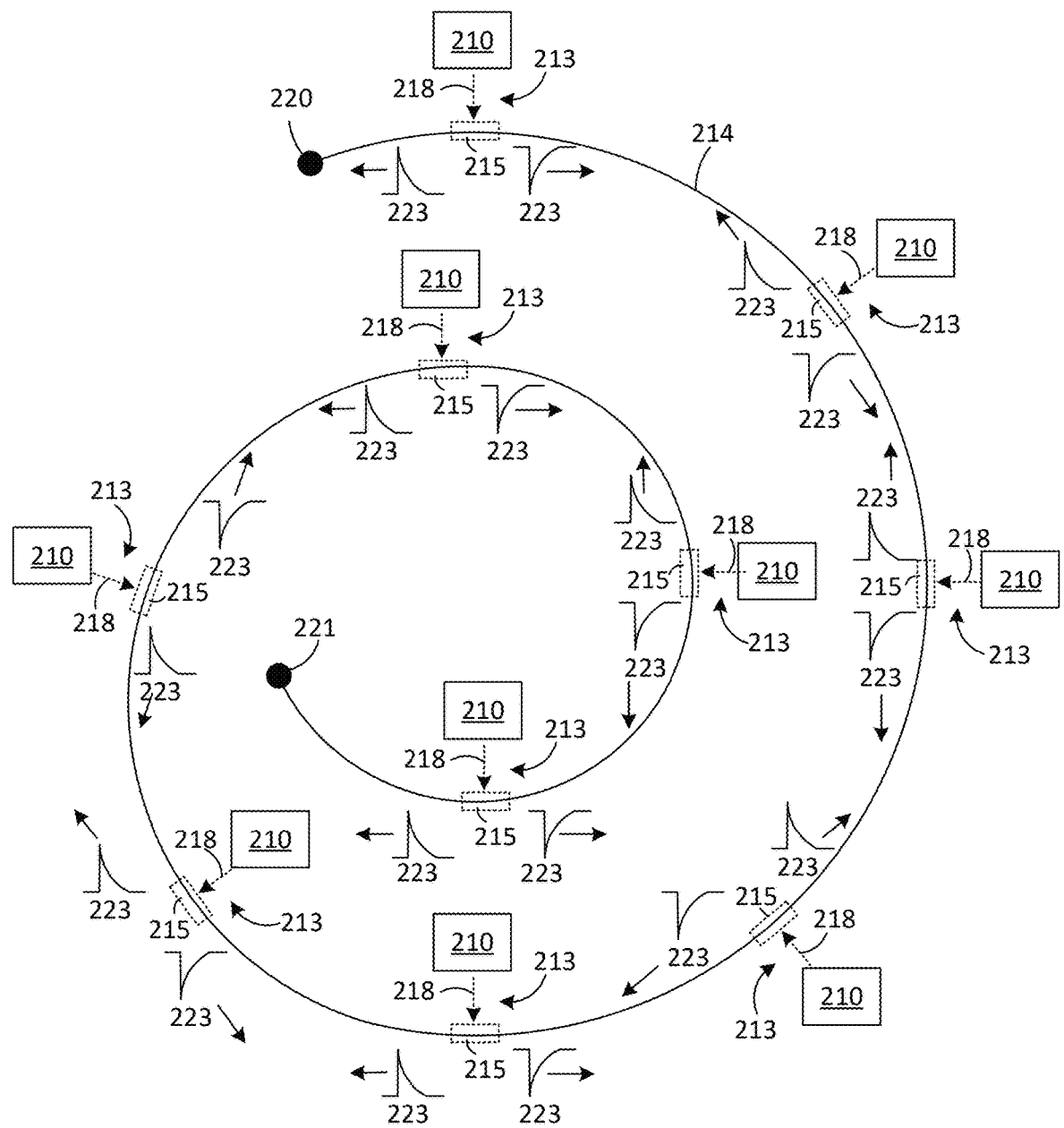
FIG. 6 shows a thermally coupled imager, according to some embodiments.
Figure 7:
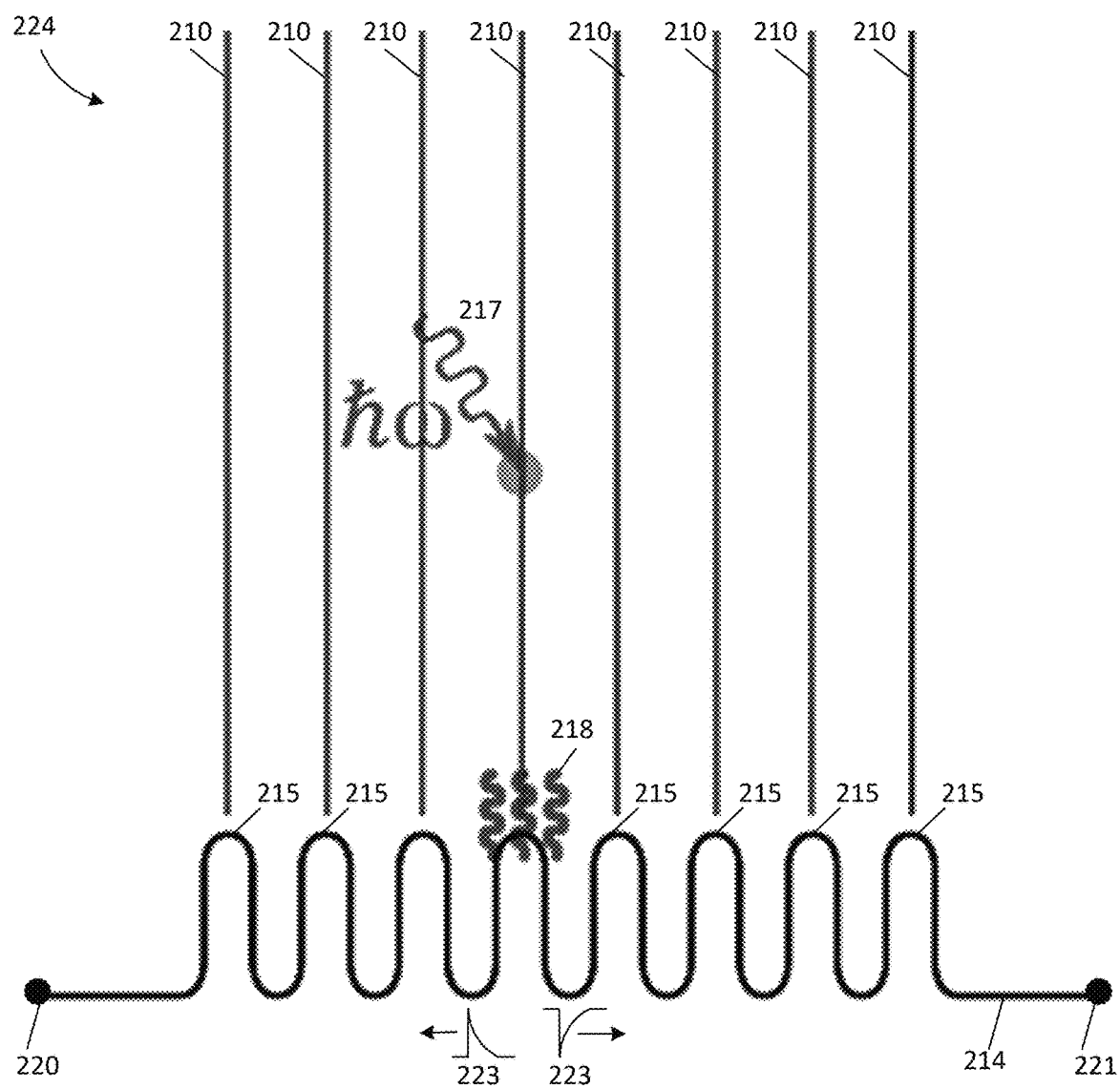
FIG. 7 shows a thermally coupled imager, according to some embodiments.
Figure 8:
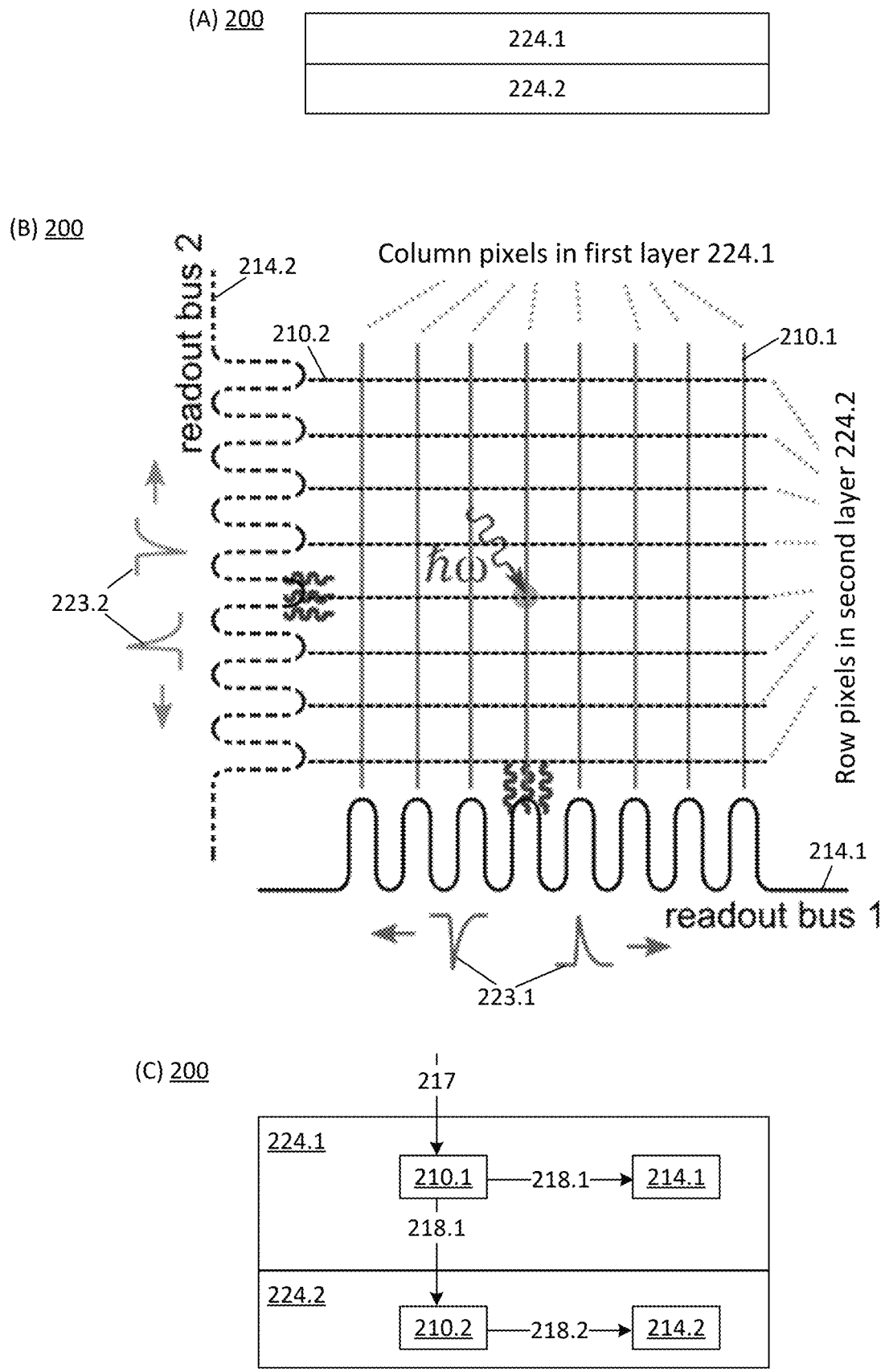
FIG. 8 shows a cross-section for layers of a thermally coupled imager in panel A, plan view of the thermally coupled imager in panel B, and a cross-section of the thermally coupled imager indicating flow of thermal energy in panel C, according to some embodiments.
Figure 9:
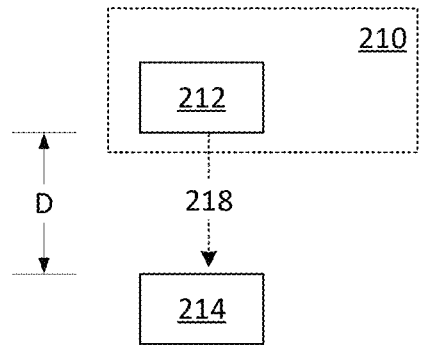
FIG. 9 shows arrangements of a resistive heater and a thermal energy relative to a substrate in a thermally coupled imager in panels A and B, according to some embodiments.
Figure 9:
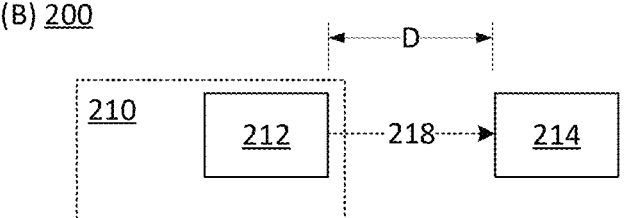

As shown in FIG. 5, thermally coupled imager 200 can include one single photon detection pixel 210 (FIG. 5A) or an arbitrary number n (FIG. 5B) of single photon detection pixels 210 arranged along thermal readout bus 214 and in thermal communication with thermal readout bus 214 at individual thermal detection portions 215 via thermally conductive galvanic isolator 213. As in FIG. 5B, single photon detection pixel 210 can be arranged in a line along the length of thermal readout bus 214, also referred to as a readout line. Thermal readout bus 214 can be a superconducting nanowire that operates as a microwave transmission line. In single photon detection pixel 210, single photon detection pixel 210 is thermal coupled to thermal readout bus 214 by resistive heater 212 that can be a resistor thermally coupled to, but electrically isolated from, thermal readout bus 214 by thermally conductive galvanic isolator 213. Thermally conductive galvanic isolator 213 can be a thin (e.g., less than 20 nm thick) electrically insulating dielectric spacer. Thermally coupled imager 200 can include other patterns than a linear pattern for thermal readout bus 214 and arrangement of single photon detection pixels 210 along thermal readout bus 214 such as two-dimensional meander pattern for thermal readout bus 214 shown in FIG. 5B or a curved pattern such as a spiral pattern for thermal readout bus 214 shown in FIG. 6 for multidimensional imaging of single photons 217. Moreover, a plurality of single photon detecting pixels 210 can be arranged along thermal readout bus 214 that has a serpentine pattern as shown in FIG. 7. Here, individual thermal detection portions 215 are disposed proximate to individual resistive heaters 212 of separate single photon detection pixels 210. Each thermal detection portion 215 can produce a pair of voltage pulses 223 that propagate in different directions in thermal readout bus 214 away from thermal detection portion 215 respectively toward first terminus 220 and second terminus 221 of thermal readout bus 214. A configuration of thermally coupled imager 200 for multidimensional imaging of single photons 217 is shown in FIG. 8, where in thermally coupled imager 200 includes a plurality of imaging layers 224 (e.g., first image in layer 224.1 and second imaging layer 224.2). In this multidimensional imaging configuration, first imaging layer 224.1 includes a plurality of first single photon detection pixels 210.1 arranged in columns that are in thermal communication with first thermal readout bus 214.1 that, through thermal communication with first single photon detection pixels 210.1, receive a portion of first thermal energy 218.1 from first single photon detection pixels 210.1. A portion of first thermal energy 218.1 produced by individual first single photon detection pixels 210.1 is independently thermally communicated from first imaging layer 224.1 and received by second imaging layer 224.2. Second imaging layer 224.1 includes a plurality of second single photon detection pixels 210.2 that are arranged in rows with respect to the columns of first single photon detection pixel 210.1, wherein individual second single photon detection pixels 210.2 are independently in thermal communication with one first single photon detection pixel 210.1 in first imaging layer 224.1. Upon receiving first thermal energy 218.1, the respective second single photon detection pixel 210.2 produces second thermal energy 218.2 that is communicated to second thermal readout best 214.2. As shown in FIG. 9, with respect to the substrate on which the single photon detection pixel 210 and thermal readout bus 214 are disposed, thermal readout bus 214 can be interposed between resistive heater 212 of single photon detection pixel 210 and the substrate (FIG. 9A), or thermal readout bus 214 can be disposed lateral to resistive heater 212 of single photon detection pixel 210 (FIG. 9). Distance D between resistive heater 212 that produces thermal energy 218 and thermal readout bus 214 can be selected to optimize efficiency in transferring thermal energy 218 from resistive heater 212 2 thermal readout burst 214. Exemplary distance D can be from 10 nanometers to 50 nanometers.

Figure 10:
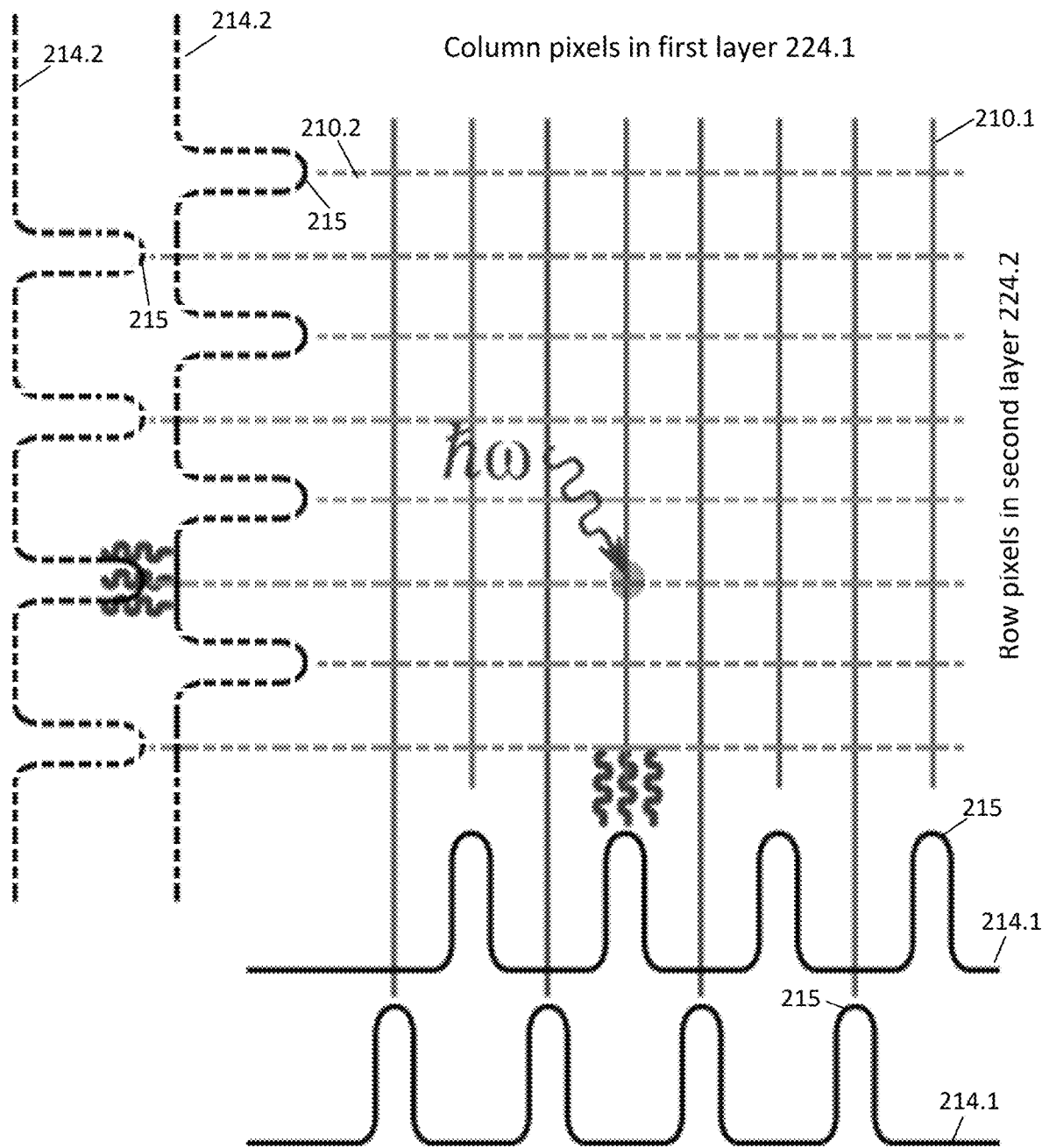
FIG. 10 shows a thermally coupled imager, according to some embodiments.
Figure 11:
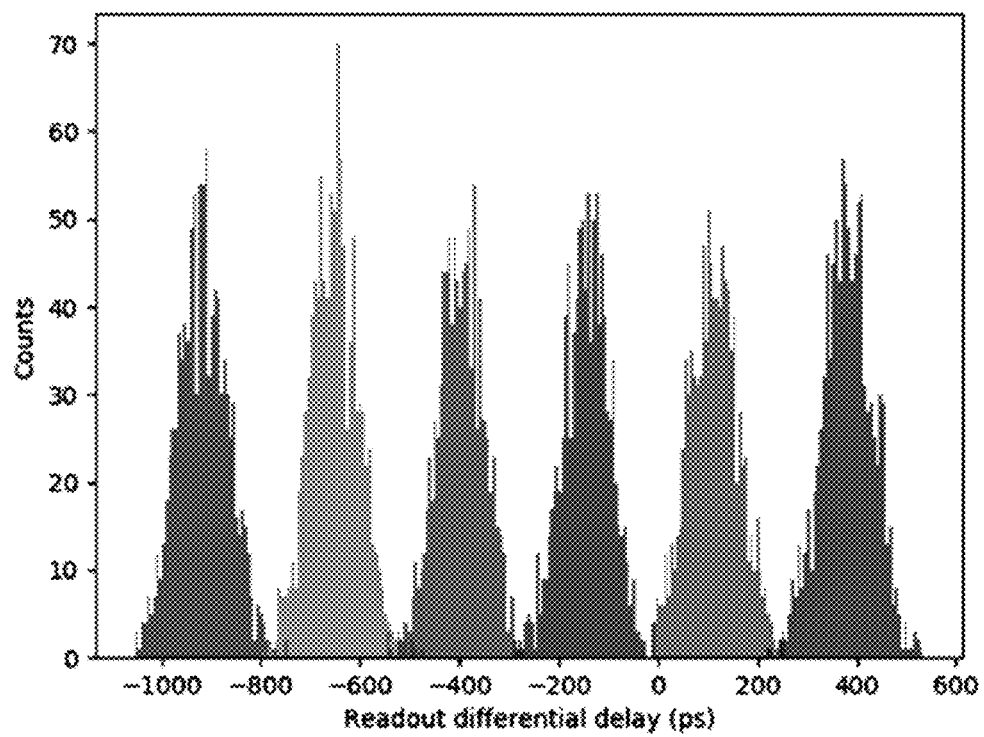
FIG. 11 shows a graph of counts versus readout differential delay for imaging single photons by a thermally coupled imager, wherein the histogram indicates the time-of-flight readout distinguishes single photons detected by individual pixels, according to some embodiments.
Figure 12:
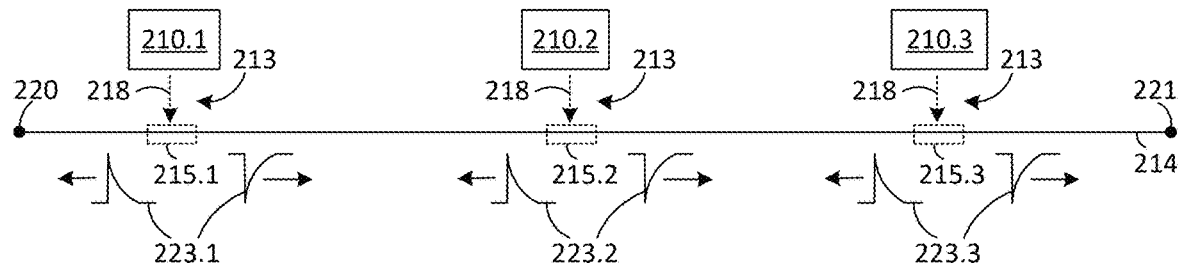
FIG. 12 shows a thermally coupled imager in panel A, a graph of counts versus thermal readout bus differential delay in panel B with temporal resolution of voltage pulses from single photon detection pixels due to selective spacing between single photon detection pixels, and a graph of counts versus thermal readout bus differential delay in panel C with overlapping voltage pulses from single photon detection pixels due to closer spacing between single photon detection pixels, according to some embodiments.
Figure 12:
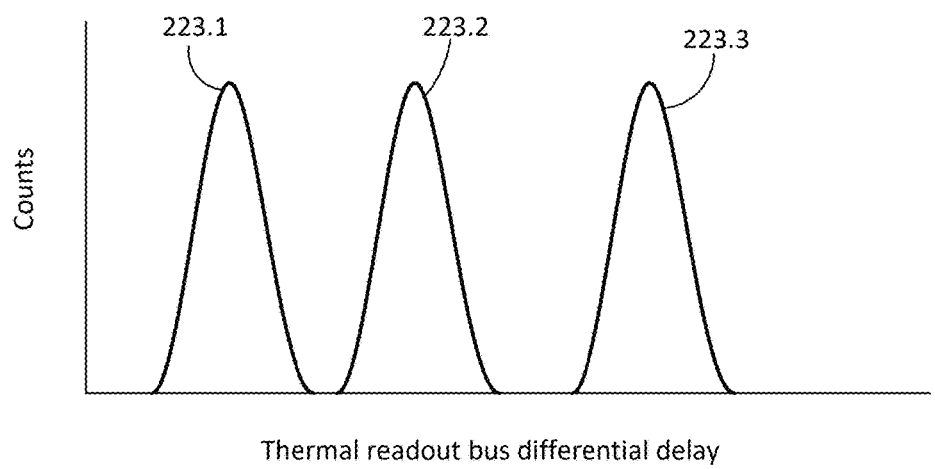
Figure 12:
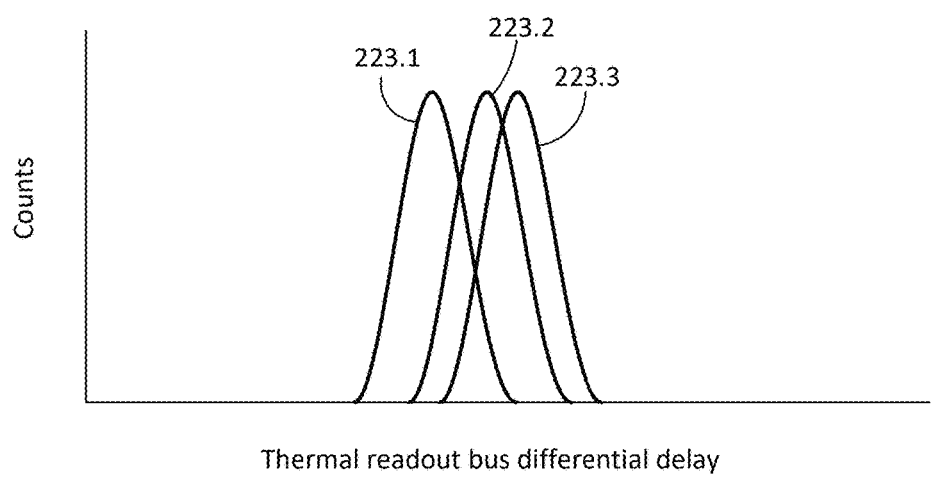

Advantageously, the active area for imaging single photons 217 with thermally coupled imager 200 scales in a compact surface area or volume. Indeed, a megapixel or larger array of single photon detection pixels 210 can be obtained in thermally coupled imager 200, e.g., by including additional rows or columns of single photon detection pixels 210 or making thermal readout bus 214 longer. Such configurational modifications may be impracticable for conventional architectures. However, in thermally coupled imager 200, neighboring single photon detection pixels 210 are electrically and thermally well-isolated from each other with little or no interaction between neighboring single photon detection pixels 210. Although dead time between sequential detection of single photons changes with changing a length of thermal readout bus 214, a higher density of single photon detection pixels 210 without increasing dead time can be achieved by including a plurality of thermal readout busses 214 as shown in FIG. 10. While voltage pulses 223 along thermal readout bus 214 provide a time-of-flight measurement. As an illustration, if dead time is 10 nanoseconds long, counting can occur at 108 counts per second. If twice as many rows and columns of single photon detection pixel 210 are included for a single thermal readout bus 214, dead time would then be 20 ns with a count rate of $50 \times 10^6$ counts per second. Increasing the number of thermal readout busses 214, as per FIG. 10, provides a favorable $N^2$ scaling factor (N=number of readout busses 214), wherein doubling the number N of thermal readout busses 214 provides read out of twice as many voltage pulses 223. Additionally, if the number of rows and columns of single photon detection pixels 210 is constant, each thermal readout bus 214 has half as much dead time compared with a single thermal readout bus 214. Accordingly, doubling the number of thermal readout busses 214 provides a factor of four increase in the count rate. As another example, 10 times as many thermal readout busses 214 provide a factor of 100 increase in the count rate for thermally coupled imager 200. The number of thermal readout busses 214 is arbitrary and can be selected based on an application or consideration of operational parameters of thermally coupled imager 200.

It should be appreciated that, at rest, superconducting nanowire single photon detectors 211 in single photon detection pixels 210 and thermal readout bus 214 are fully superconducting and produce no voltage transients, with thermally coupled imager 200 is at a uniform cryogenic temperature. Single photon detection pixel 210 are current-biased with electrical current bias 216 such that single photon detection pixels 210 are sensitive to single incoming photons 217. Electrical current bias 216 can be, e.g., from 70% to 90% of the critical current so that when single photon 217 is received by superconducting nanowire single photon detector 211, superconducting nanowire single photon detector 211 produces a self-heating hotspot. Thermal readout bus (another superconducting nanowire) is current-biased with electrical current readout bias 222 that is at a lower fraction of the critical current for thermal readout bus 214, specifically below the retrapping current of the superconducting nanowire, e.g., from 20% to 50% of the critical current, depending on the material. The retrapping current refers to the electrical current at which a superconducting nanowire that has become resistive (e.g., due to heating) has a low enough current-induced Joule heating to recover the superconducting state. Hence, if a superconducting nanowire is biased above the retrapping current, when the superconducting nanowire becomes resistive (e.g., through external heating or noise), the superconducting nanowire remains latched in the resistive state because Joule heating of the electrical current flowing through the resistive section of the superconducting nanowire produces enough thermal energy to keep that section hot. When the bias current drops below the retrapping current, the Joule heating power is low enough such that the resistive section cools and becomes superconducting again. By operating thermally coupled imager 200 such that thermal readout bus 214 is below its retrapping current at all times, this resistive latched Joule-heating state does not occur.

Figure 2:
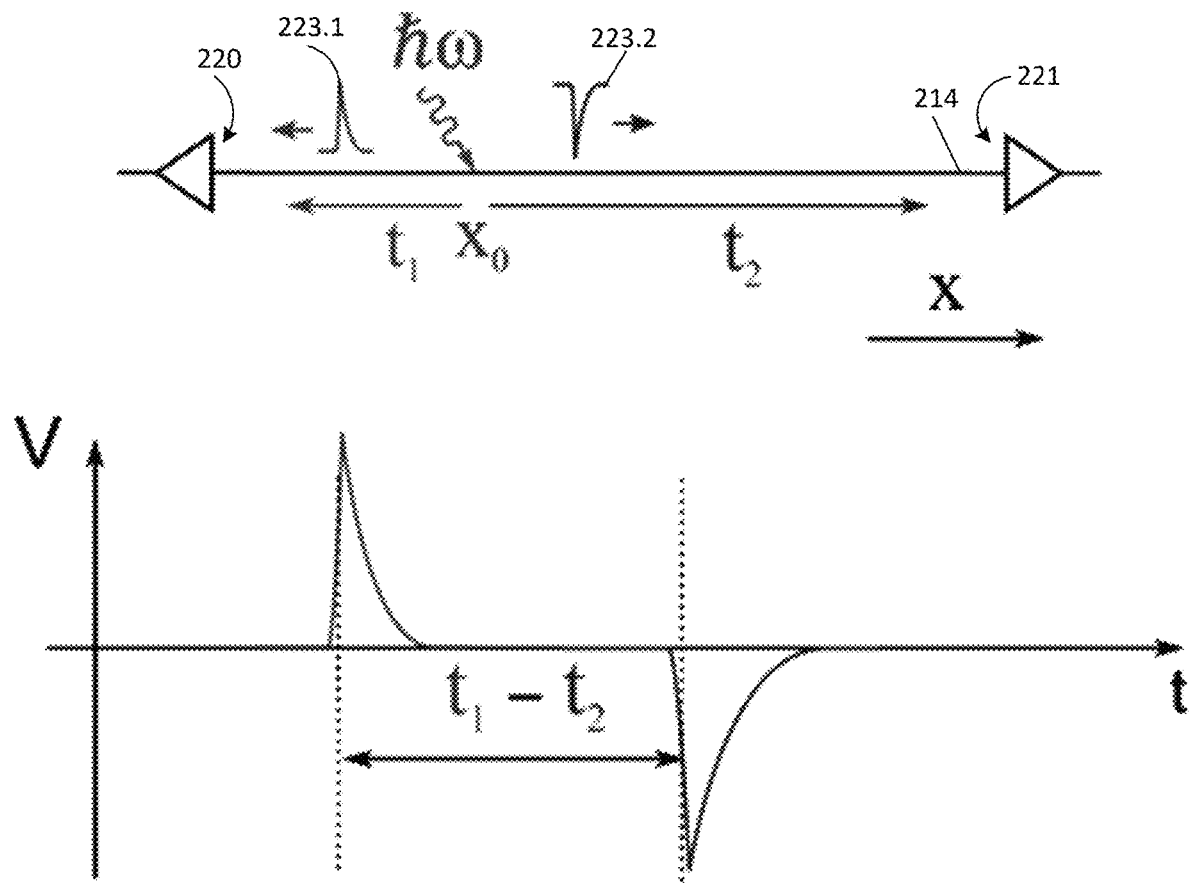
FIG. 2 shows voltage pulse properties for a thermal readout bus of a thermally coupled imager, according to some embodiments, wherein a differential delay time (t1-t2) gives information about the location of arrival of a single photon.
Figure 14:
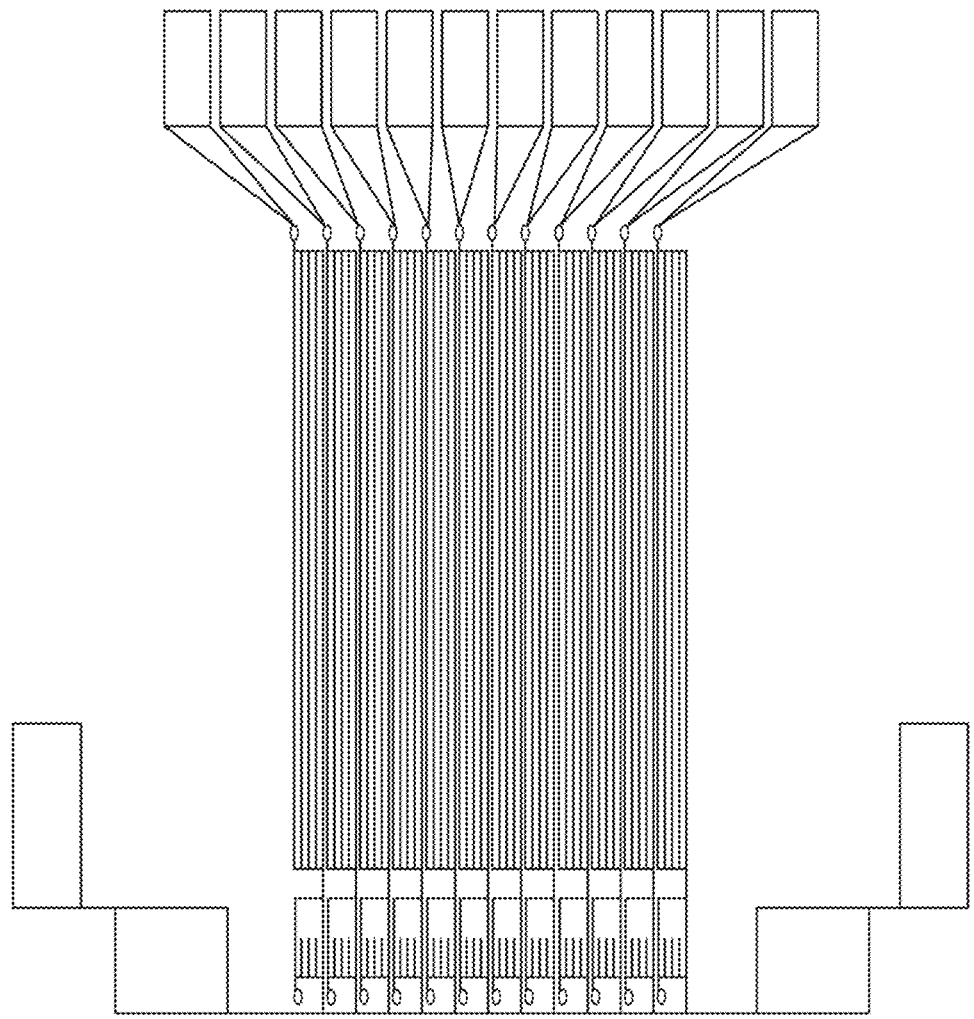
FIG. 14 shows a layout of a thermally coupled imager, according to some embodiments.
Figure 15:
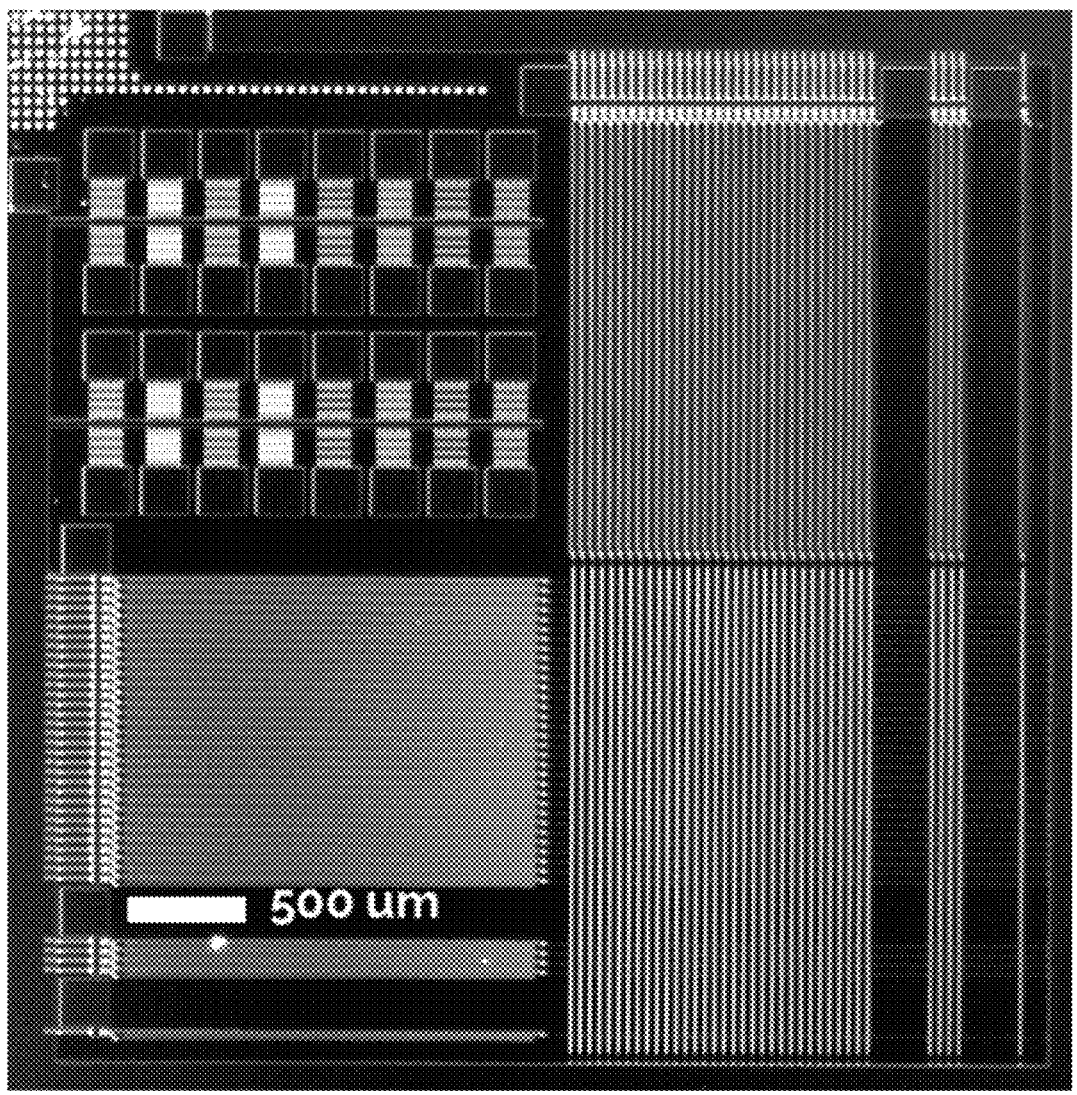
FIG. 15 shows a micrograph of a thermally coupled imager made according to the process shown in FIG. 13, wherein the thermally coupled imager was formed by optical lithography so that the row and column SNSPDs were made from two separate layers of WSi separated by a 25 nm thick layer of silicon dioxide, according to some embodiments.
Figure 16:
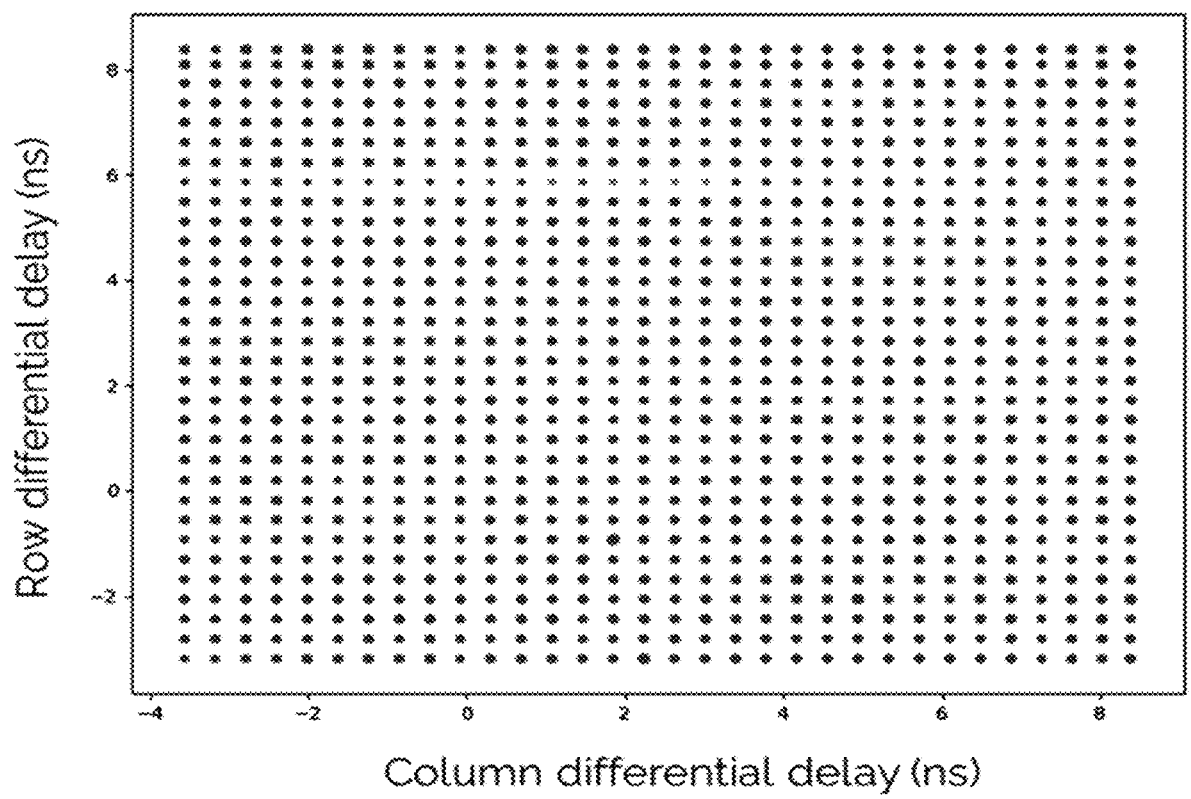
FIG. 16 shows results from flood illuminating the thermally coupled imager of FIG. 15 and reading out the row and column positions from the thermal readout busses, according to some embodiments. Each of the dots was acquired from several hundred detection events in panel A, with a zoomed view shown in panel B, according to some embodiments.
Figure 16:
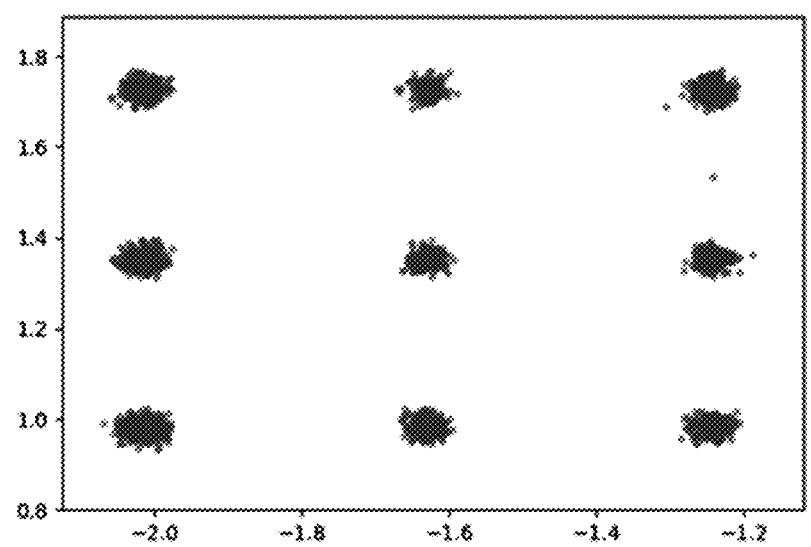
Figure 17:
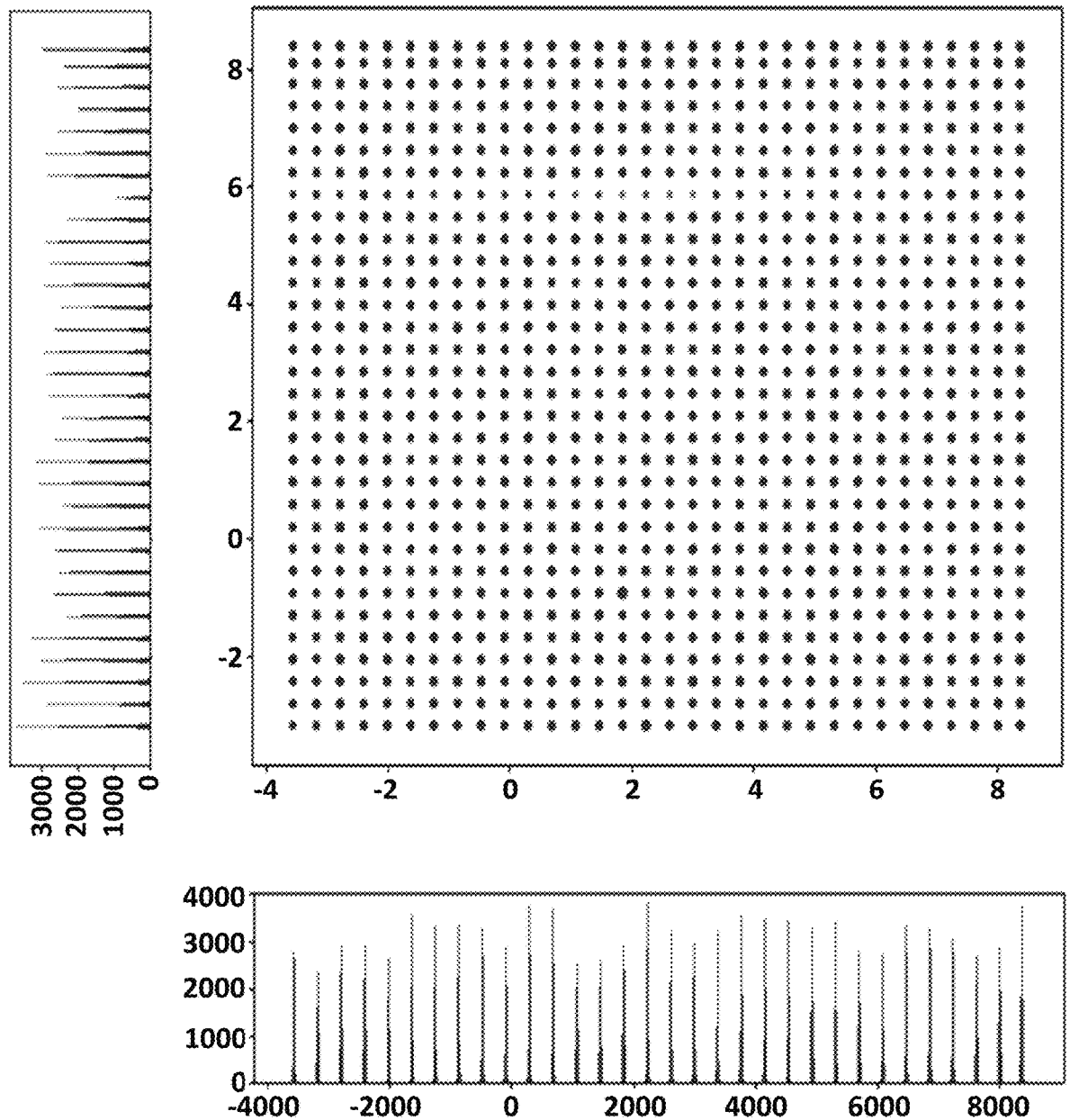
FIG. 17 shows histograms for row-readout and column-readout for the data shown in FIG. 16, with spacing between adjacent bins due to spacing among the individual single photon detection pixels and evidencing independence among row and column readouts, according to some embodiments.
Figure 18:
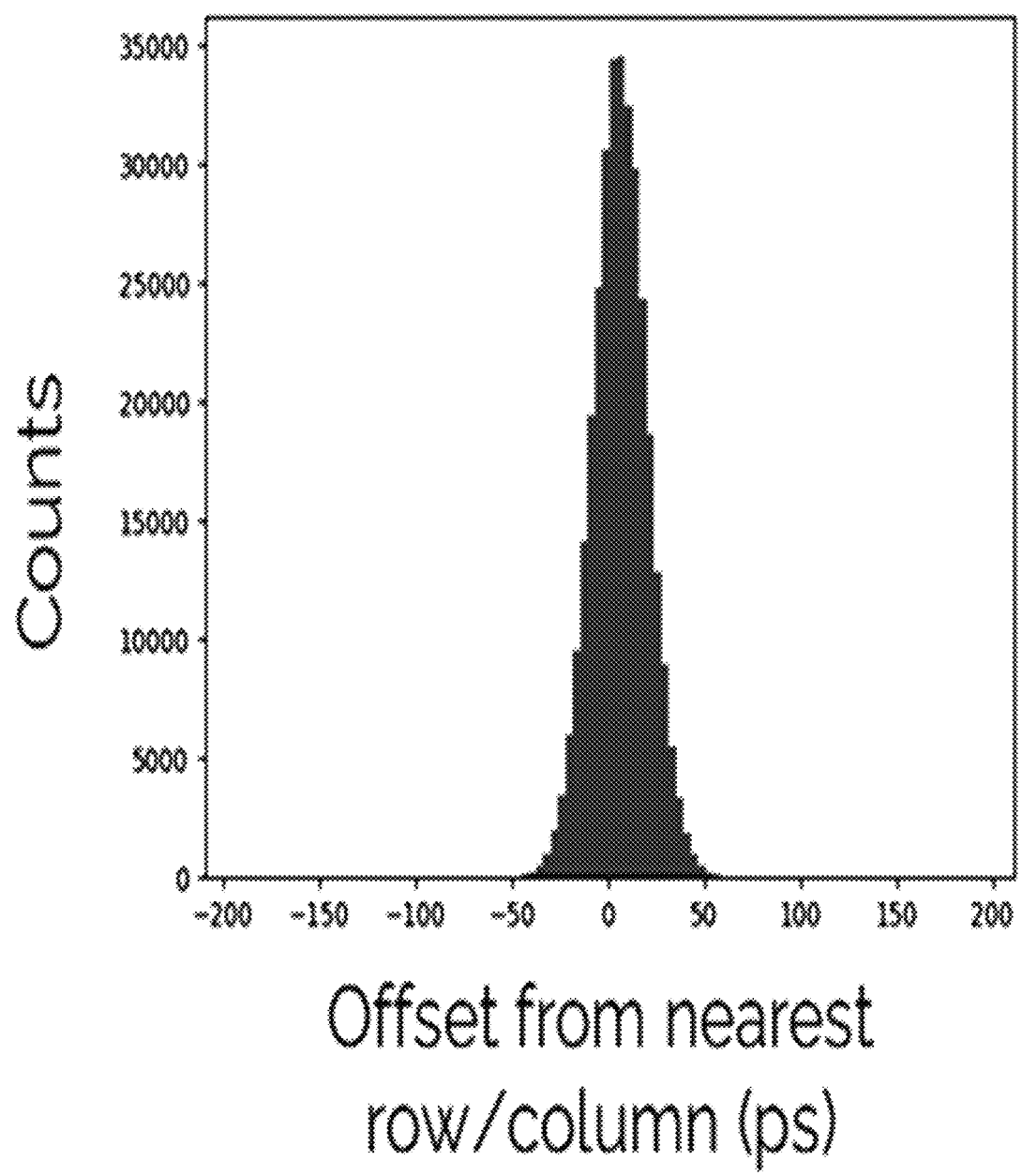
FIG. 18 shows a histogram for one of the histograms shown in FIG. 17, wherein the FWHM was less than 30 picoseconds, according to some embodiments.
Figure 19:
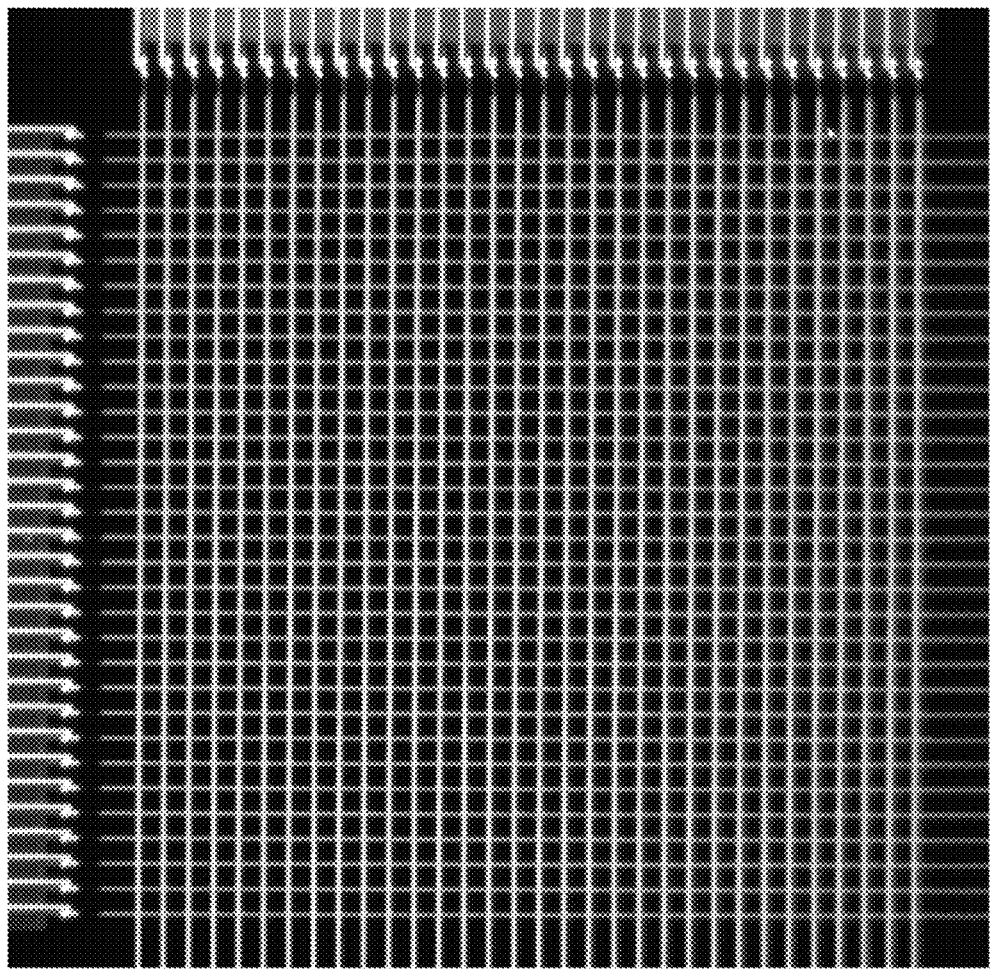
FIG. 19 shows a thermally coupled imager with two imaging layers, according to some embodiments.

When single photon 217 is detected (i.e., received by single photon detection pixel 210) by one of superconducting nanowire single photon detector 211t, electrical current bias 216 is diverted out of superconducting nanowire single photon detector 211 into resistive heater 212, the resistive portion of the thermal coupling between single photon detection pixel 210 and thermally conductive galvanic isolator 213. Electrical current bias 216 that is diverted produces Joule heating in resistive heater 212. Phonons generated from the Joule heating of resistive heater 212 are transmitted through the electrically insulating layer of thermally conductive galvanic isolator 213 and to thermal readout bus 214, wherein thermal readout bus 214 transitions from a superconducting state of the nanowire in a portion of thermal readout bus 214 referred to as thermal detection portion 215 (e.g., a small area that can be less than 1 um in length) that becomes resistive, e.g., at location x_0 shown in FIG. 2. After thermal detection portion 215 of thermal readout bus 214 becomes resistive, two voltage pulses 223 (first voltage pulse 223.1, second voltage pulse 223.2) are created due to electrical current readout bias 222. In FIG. 2, positive voltage pulse 223.1 travels to the left from x_0, and negative voltage pulse 223.2 travels to the right from x_0. Voltage pulses 223 propagate through thermal readout bus 214 at a ~1% of the speed of light until voltage pulses 223 are detected by amplifiers connected either end (220, 221) of thermal readout bus 214. The slow propagation speed of voltage pulses 223 is due to kinetic inductance of thermal readout bus 214 that provides a high impedance. The high impedance of thermal readout bus 214 can be transformed to 50 Ohm using tapers as shown in FIG. 14. The high impedance of thermal readout bus 214 enables thermal readout bus 214 to be shorter than otherwise useful due to the slow signal propagation speed as well as achieving signal amplification. As shown in FIG. 2, time-of-flight information from voltage pulses 223 that arrive at the amplifiers is used to resolve both arrival time and location of single photon 217 at a particular single photon detection pixel 210 on thermally coupled imager 200. While electrical current bias 216 is in resistive heater 212, the thermally conductive galvanic isolator 213 remains hot, and that particular single photon detection pixel 210 is insensitive to further single photons. Electrical current bias stays diverted for a time constant of L/R, wherein L is the kinetic inductance of the SNSPD, and R is the resistance of the thermal coupler. Over time constant L/R, electrical current bias 216 returns to superconducting nanowire single photon detector 211 so that single photon detection pixel 210 becomes sensitive to detection of single photon 217, and thermally conductive galvanic isolator 213. Once thermally conductive galvanic isolator 213, thermal readout bus 214 returns to the superconducting state.

Beneficially, multiple single photons can be detected simultaneously, wherein the single photons are detected by different single photon detection pixels 210, in contrast to conventional long-nanowire devices in which a single photon generates a self-heating hotspot that diverts all of the current out of the device. Since the SNSPI of the conventional device is operated well above the retrapping current, the Joule-heated hotspot grows until all of the current is diverted out of the SNSPI nanowire and into the load, a process that takes several tens of microseconds and blocks further detection of further photons until the entire nanowire can be re-biased with current, limiting maximum count rate of the conventional imager. Thermally coupled imager 200 overcomes this limitation of conventional devices and operates at much higher count rates and detects simultaneous single photon arrivals because thermal readout bus 214 is biased below the retrapping current, which is too low to produce a self-heating hotspot. As a result, a photon detection event only diverts a small fraction of electrical current readout bias 222 in thermal readout bus 214 as voltage pulse 223. When thermally conductive galvanic isolator 213 cools off (e.g., within 10 ns), thermal readout bus 214 returns to the superconducting state at its full bias current 222 and maximum sensitivity with no additional downtime.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix(s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A thermally coupled imager for performing time and position sensitive imaging of single photons, the thermally coupled imager comprising:
    a single photon detection pixel comprising:
        a superconducting nanowire single photon detector that receives an electrical current bias and that, in response to receiving a single photon, transitions from a superconducting state via heating; and
        a resistive heater in electrical communication with the superconducting nanowire single photon detector and electrically connected in parallel with the superconducting nanowire single photon detector, such that when the single photon is received by the superconducting nanowire single photon detector:
            the electrical current bias is diverted from being received by the superconducting nanowire single photon detector and is electrically communicated to the resistive heater; the resistive heater converts the electrical current bias into thermal energy, and the thermal energy is thermally communicated to a thermally conductive galvanic isolator;
        the thermally conductive galvanic isolator in thermal communication with the resistive heater and a thermal readout bus, such that the thermally conductive galvanic isolator receives the thermal energy from the resistive heater, electrically isolates the single photon detection pixel from the thermal readout bus, and thermally communicates the thermal energy from the resistive heater to the thermal readout bus in an absence of electrical crosstalk between the single photon detection pixel and the thermal readout bus; and
        the thermal readout bus in thermal communication with the thermally conductive galvanic isolator and in electrical isolation with the single photon detection pixel and comprising:
    a superconducting nanowire;
    a thermal detection portion disposed proximate to the resistive heater in thermal communication with the thermally conductive galvanic isolator;
    a total length L between a first terminus and a second terminus, such that:
        the thermal readout bus receives an electrical current readout bias, the thermal detection portion is interposed between the first terminus and the second terminus and arranged at a first distance L1 from the first terminus and a second distance L2 from the second terminus;

the thermal detection portion receives the thermal energy from the resistive heater via the thermally conductive galvanic isolator, in response to receiving the thermal energy, the thermal detection portion transitions from a superconducting state and produces a pair of voltage pulses from the electrical current readout bias that propagate in the thermal readout bus away from the thermal detection portion, such that one voltage pulse propagates from the thermal detection portion toward the first terminus during a first time-of-flight period, and the other voltage pulse propagates from the thermal detection portion toward the second terminus during a second time-of-flight period, wherein the pair of voltage pulses, the first time-of-flight period, and the second time-of-flight period provide a time of arrival and position of the single photon received by the single photon detection pixel;

a second single photon detection pixel arranged along the thermal readout bus and electrically isolated from the single photon detection pixel;

the thermal readout bus comprises a second thermal detection portion disposed proximate to the second single photon detection pixel and in thermal communication with the second single photon detection pixel via the thermally conductive galvanic isolator that electrically isolates the thermal readout bus and the single photon detection pixel, wherein:

the second single photon detection pixel receives a second single photon and produces thermal energy in response to receipt of the second single photon, and the second thermal detection portion of the thermal readout bus receives the thermal energy from the second single photon detection pixel, transitions from the superconducting state, and produces a second pair of voltage pulses that correspond to a position of the second single photon detection pixel along the thermal readout bus, such that of the second pair of voltage pulses: one voltage pulse propagates from the second thermal detection portion toward the first terminus during a third time-of-flight period, and the other voltage pulse propagates from the second thermal detection portion toward the second terminus during a fourth time-of-flight period, and the second pair of voltage pulses, the third time-of-flight period, and the fourth time-of-flight period provide a time of arrival and position of the second single photon detection pixel that received the second single photon; and additional single photon detection pixels, such that each additional single photon detection pixel:

is disposed proximate to and in thermal communication with individual thermal detection portions of the thermal readout bus, is electrically isolated from the other single photon detection pixels and the thermal readout bus, and produces, in response to receiving a single photon, thermal energy that is communicated to the thermal readout bus at its respective thermal detection portion that produces pairs of voltage pulses in response to receiving the thermal energy that propagate separately toward the first terminus and the second terminus for determination of a time of arrival and position of the particular single photon detection pixel that received the respective single photon, wherein the single photon detection pixel, the second single photon detection pixel, and the additional single photon detection pixel are arranged in a non-linear array format and perform multidimensional imaging of single photons received by the thermally coupled imager.

2. The thermally coupled imager of claim 1, wherein the second single photon detection pixel comprises:

a superconducting nanowire single photon detector that receives an electrical current bias and that, in response to receiving the second single photon, transitions from a superconducting state via heating; and a resistive heater in electrical communication with the superconducting nanowire single photon detector and electrically connected in parallel with the superconducting nanowire single photon detector, such that when the second single photon is received by the superconducting nanowire single photon detector:

the electrical current bias is diverted from being received by the superconducting nanowire single photon detector and is electrically communicated to the resistive heater; the resistive heater converts the electrical current bias into thermal energy, and the thermal energy is thermally communicated to the thermally conductive galvanic isolator, wherein the thermally conductive galvanic isolator receives the thermal energy from the resistive heater of the second single photon detection pixel, electrically isolates the second single photon detection pixel from the thermal readout bus, and thermally communicates the thermal energy from the resistive heater of the second single photon detection pixel to the thermal readout bus in an absence of electrical crosstalk between the single photon detection pixel, the second single photon detection pixel, and the thermal readout bus.

3. The thermally coupled imager of claim 1, further comprising a second imaging layer thermal readout bus, wherein the single photon detection pixel, the thermally conductive galvanic isolator, and the thermal readout bus of claim 1 are arranged in a first imaging layer that is electrically isolated from the second imaging layer, and the second imaging layer comprises:

a single photon detection pixel in thermal communication with a thermal readout bus;

a thermally conductive galvanic isolator interposed between and that electrically isolates the single photon detection pixel from the thermal readout bus, such that:

the single photon detection pixel in the first imaging layer communicates some of the thermal energy to the single photon detection pixel in the second imaging layer in response to receiving the single photon, the single photon detection pixel in the second imaging layer receives the thermal energy from the single photon detection pixel in the first imaging layer and produces thermal energy that is communicated from the single photon detection pixel in the second imaging layer to the thermal readout bus in the second imaging layer, and the thermal readout bus in the second imaging layer produces a pair of voltage pulses from which the two-dimensional position of the single photon received by the thermally coupled imager at the superconducting nanowire single photon detector in the first imaging layer is determined.

4. The thermally coupled imager of claim 3, wherein the second imaging layer further comprises:
additional single photon detection pixels, such that each additional single photon detection pixel in the second imaging layer:
is disposed proximate to and in thermal communication with individual thermal detection portions of the thermal readout bus in the second imaging layer,
is electrically isolated from the other single photon detection pixels and the thermal readout bus in the second imaging layer and in the first imaging layer, and
produces, in response to receiving thermal energy from the first imaging layer, thermal energy that is communicated to the thermal readout bus in the second imaging layer at its respective thermal detection portion that produces pairs of voltage pulses in response to receiving the thermal energy that propagate separately toward a first terminus and a second terminus of the thermal readout bus in the second imaging layer for determination of the position of the particular single photon detection pixel that received the respective single photon in the first imaging layer.

5. The thermally coupled imager of claim 3, wherein, in the second imaging layer, the single photon detection pixel, the second single photon detection pixel, and the additional single photon detection pixel are arranged in a linear array format.

6. The thermally coupled imager of claim 3, wherein, in the second imaging layer, the single photon detection pixel, the second single photon detection pixel, and the additional single photon detection pixel are arranged in a non-linear array format and perform multidimensional imaging of single photons received by the thermally coupled imager in the first imaging layer.

7. The thermally coupled imager of claim 1, wherein the superconducting nanowire single photon detector comprises a meander pattern.

8. The thermally coupled imager of claim 1, wherein the superconducting nanowire single photon detector consists essentially of a linear pattern.

9. A thermally coupled imager for performing time and position sensitive imaging of single photons, the thermally coupled imager comprising:
a thermally conductive galvanic isolator;
a thermal readout bus in thermal communication with the thermally conductive galvanic isolator;
a plurality of single photon detection pixels, wherein the single photon detection pixels are:
electrically isolated from each other and from the thermal readout bus, in thermal communication with thermal readout bus via the thermally conductive galvanic isolator that is interposed between the single photon detection pixels and the thermal readout bus, and
arranged along the thermal readout bus,
such that each single photon detection pixel:
is individually in thermal communication with the thermal readout bus in a different location along the thermal readout bus at separate thermal detection portion of the thermal readout bus, but electrically isolated from the thermal readout bus via interdisposition of the thermally conductive galvanic isolator between individual single photon detection pixel and the thermal readout bus,
individually produces thermal energy in response to receiving a single photon, and
communicates the thermal energy to the thermal readout bus via the thermally conductive galvanic isolator,
wherein the thermal readout bus, in response to receiving the thermal energy from the individual single photon detection pixel at a respective thermal detection portion, transitions from a superconducting state and produces:
a pair of voltage pulses corresponding to a position of the individual single photon detection pixel along the thermal readout bus so that the pair of voltage pulses propagate in the thermal readout bus, wherein one voltage pulse of the pair propagates toward a first terminus during a first time-of-flight period, and the other voltage pulse of the pair propagates toward a second terminus during a second time-of-flight period,
such that the pair of voltage pulses, the first time-of-flight period, and the second time-of-flight period provide a time of arrival and position of the individual single photon detection pixel that received the single photon, wherein the single photon detection pixels are arranged in a non-linear array format and perform multidimensional imaging of single photons received by the thermally coupled imager.

10. The thermally coupled imager of claim 9, further comprising a second imaging layer thermal readout bus,
wherein the thermally conductive galvanic isolator, the thermal readout bus, and the single photon detection pixels of claim 9 are arranged in a first imaging layer that is electrically isolated from the second imaging layer, and
the second imaging layer comprises:
a plurality of single photon detection pixels in thermal communication with a thermal readout bus;
a thermally conductive galvanic isolator interposed between and that electrically isolates the single photon detection pixels from the single photon detection pixel, such that:
individual single photon detection pixels in the first imaging layer communicate thermal energy to an individual single photon detection pixel in the second imaging layer in response to receiving single photons,
individual single photon detection pixels in the second imaging layer receives thermal energy from individual single photon detection pixels in the first imaging layer and produces thermal energy that is communicated from the single photon detection pixel in the second imaging layer to the thermal readout bus in the second imaging layer, and
the thermal readout bus in the second imaging layer in response to receiving thermal energy produces a pair of voltage pulses from which the two-dimensional position of the single photon received by the thermally coupled imager at the superconducting nanowire single photon detector in the first imaging layer is determined.

11. The thermally coupled imager of claim 10, wherein each single photon detection pixel in the second imaging layer:

is disposed proximate to and in thermal communication with individual thermal detection portions of the thermal readout bus in the second imaging layer, is electrically isolated from the other single photon detection pixels and the thermal readout bus in the second imaging layer and in the first imaging layer, and produces, in response to receiving thermal energy from the first imaging layer, thermal energy that is communicated to the thermal readout bus in the second imaging layer at its respective thermal detection portion that produces pairs of voltage pulses in response to receiving the thermal energy that propagate separately toward a first terminus and a second terminus of the thermal readout bus in the second imaging layer for determination of the position of the particular single photon detection pixel that received the respective single photon in the first imaging layer.

12. The thermally coupled imager of claim 10, wherein, in the second imaging layer, the single photon detection pixels are arranged in a linear array format.

13. The thermally coupled imager of claim 10, wherein, in the second imaging layer, the single photon detection pixels are arranged in a non-linear array format and perform multidimensional imaging of single photons received by the thermally coupled imager in the first imaging layer.

14. The thermally coupled imager of claim 10, wherein, in the second imaging layer, the position of single photon detection pixels are the same as the position of single photon detection pixels in the first imaging layer so that thermal energy produced by a single photon detection pixel in the imaging layer is received by a single photon detection pixel in the second imaging layer.

15. The thermally coupled imager of claim 10, wherein, in the second imaging layer, the single photon detection pixels are arranged in rows and columns that match the position of single photon detection pixels in the first imaging layer that are arranged in rows and columns, so that thermal energy produced by a single photon detection pixel in the imaging layer is received by a single photon detection pixel in the second imaging layer.

16. The thermally coupled imager of claim 9, wherein the superconducting nanowire single photon detector comprises a meander pattern.

17. The thermally coupled imager of claim 9, wherein the superconducting nanowire single photon detector consists essentially of a linear pattern.

* * * * *